US012383855B2

(12) United States Patent
Yadav et al.

(10) Patent No.: US 12,383,855 B2
(45) Date of Patent: Aug. 12, 2025

(54) HIGH EFFICIENCY FILTER MEDIA

(71) Applicant: Donaldson Company, Inc., Bloomington, MN (US)

(72) Inventors: Rakesh K. Yadav, Lakeville, MN (US); Daniel L. Tuma, St. Paul, MN (US); Robert R. Levac, Burnsville, MN (US); Byron G. Griffin, Mounds View, MN (US); Jonathan M. Beckett, Richfield, MN (US); Anil Suthar, Eden Prairie, MN (US); Robert J. Pannepacker, Jr., Oreland, PA (US)

(73) Assignee: Donaldson Company, Inc., Bloomington, MN (US)

( * ) Notice: Subject to any disclaimer, the term of this patent is extended or adjusted under 35 U.S.C. 154(b) by 386 days.

(21) Appl. No.: 17/911,612

(22) PCT Filed: Mar. 24, 2021

(86) PCT No.: PCT/US2021/023975
§ 371 (c)(1),
(2) Date: Sep. 14, 2022

(87) PCT Pub. No.: WO2021/195275
PCT Pub. Date: Sep. 30, 2021

(65) Prior Publication Data
US 2023/0124690 A1 Apr. 20, 2023

Related U.S. Application Data

(60) Provisional application No. 62/994,262, filed on Mar. 24, 2020.

(51) Int. Cl.
*B01D 46/52* (2006.01)
*B01D 39/16* (2006.01)

(52) U.S. Cl.
CPC ........ *B01D 46/525* (2013.01); *B01D 39/163* (2013.01); *B01D 39/1692* (2013.01);
(Continued)

(58) Field of Classification Search
CPC ............................................ B01D 46/525–527
See application file for complete search history.

(56) References Cited

U.S. PATENT DOCUMENTS 5,275,743 A 1/1994 Miller et al.
5,972,063 A 10/1999 Dudrey et al.
(Continued)

FOREIGN PATENT DOCUMENTS

CA 2821528 5/2006
CN 101961607 2/2011
(Continued)

OTHER PUBLICATIONS

Machine translation of DE102010014060 (Year: 2011).*
(Continued)

*Primary Examiner* — Robert Clemente
(74) *Attorney, Agent, or Firm* — Pauly, DeVries Smith & Deffner LLC

(57) ABSTRACT

Filtration media packs, filter elements, and media are disclosed, including media packs having a plurality of layers of single facer media wherein the layers of single facer media include a fluted sheet, a facing sheet, and a plurality of flutes extending between the fluted sheet and the facing sheet, with the fluted sheet and facing sheet formed of multi-layer media can include a polytetrafluoroethylene (PTFE) layer supported by a polymeric scrim layer.

20 Claims, 14 Drawing Sheets

(52) U.S. Cl.
CPC .............. *B01D 2239/0627* (2013.01); *B01D 2239/0654* (2013.01); *B01D 2239/069* (2013.01); *B01D 2239/1233* (2013.01); *B01D 2239/1258* (2013.01); *B01D 2239/1291* (2013.01)

(56) References Cited

U.S. PATENT DOCUMENTS

| | | | |
|---|---|---|---|
| 6,171,684 | B1 | 1/2001 | Kahlbaugh et al. |
| 6,334,881 | B1 | 1/2002 | Giannetta et al. |
| 7,008,465 | B2 | 3/2006 | Graham et al. |
| 7,501,003 | B2 | 3/2009 | Muller et al. |
| 8,282,712 | B2 | 10/2012 | Chi et al. |
| 8,986,432 | B2 | 3/2015 | Wertz et al. |
| 9,474,994 | B2 | 10/2016 | Gao et al. |
| 10,245,545 | B2 | 4/2019 | Hara et al. |
| 10,265,654 | B2 | 4/2019 | Shibuya et al. |
| 10,272,375 | B2 | 4/2019 | Choi |
| 2003/0203696 | A1 | 10/2003 | Healey |
| 2014/0033665 | A1 | 2/2014 | Smithies et al. |
| 2014/0165517 | A1 | 6/2014 | Hara et al. |
| 2019/0224609 | A1 | 7/2019 | Niki et al. |
| 2019/0232211 | A1 | 8/2019 | Niki et al. |

FOREIGN PATENT DOCUMENTS

| | | |
|---|---|---|
| DE | 202007008371 | 8/2007 |
| DE | 102010014060 | 10/2011 |
| JP | 6115596 | 3/2017 |
| WO | 9831451 | 7/1998 |
| WO | 2006096180 | 9/2006 |
| WO | 2007054952 | 7/2007 |
| WO | 2009003119 | 12/2008 |
| WO | 2018062112 | 4/2018 |
| WO | 2021195275 | 9/2021 |

OTHER PUBLICATIONS

"International Preliminary Report on Patentability," for PCT Application No. PCT/US2021/023975 mailed Oct. 6, 2022 (9 pages).
"International Search Report and Written Opinion," for PCT Application No. PCT/US2021/023975 mailed May 14, 2021 (15 pages).
"Reemay Spunbonded Polyester Nonwoven Fabrics—Style #2024," Kavon Filter Products Co., Product Specifications available at URL <https://filters.kavonfilter.com/item/filter-paper/reemay-spunbonded-polyester-nonwovens/item-1112> at least as early as 2016 (2 pages).
"Reemay Spunbonded Polyester Nonwoven Fabrics—Style 2214," Kavon Filter Products Co., Product Specifications available at URL <https://filters.kavonfilter.com/item/filter-paper/reemay-spunbonded-polyester-nonwovens/item-1117> at least as early as 2016 (2 pages).
"Spun Bond Filter Media," JDB Dense Flow Pneumatic Conveying Systems Technical Specifications for Spun Bond Polyester Filter Cartridges, May 2019, accessible at http://jdbdenseflow.com/uploads/Spun%20Bond%20Filter%20Media.pdf (2 pages).
Chhabra, Rajeev "Nonwoven Uniformity—Measurements Using Image Analysis," The Procter & Gamble Company, INJ Spring 2003 (8 pages).
Emadi, Mina, et al. "Measurement of the Uniformity of Thermally Bonded Points in Polypropylene Spunbonded Non-Wovens using Image Processing and its Relationship with their Tensile Properties," AUTEX Research Journal, vol. 18, No. 4, Dec. 2018 (14 pages).
Leising, Craig "Surface Topography of Nonwoven using 3D Profilometry," Nanovea 2010 Information (7 pages).
Romanszki, Lorand, et al. "Estimating Nanoscale Surface Roughness of Polyethylene Terephthalate Fibers," ACS Omega 2020, 5, 3670-3677 (8 pages).

* cited by examiner

CLOSEUP A

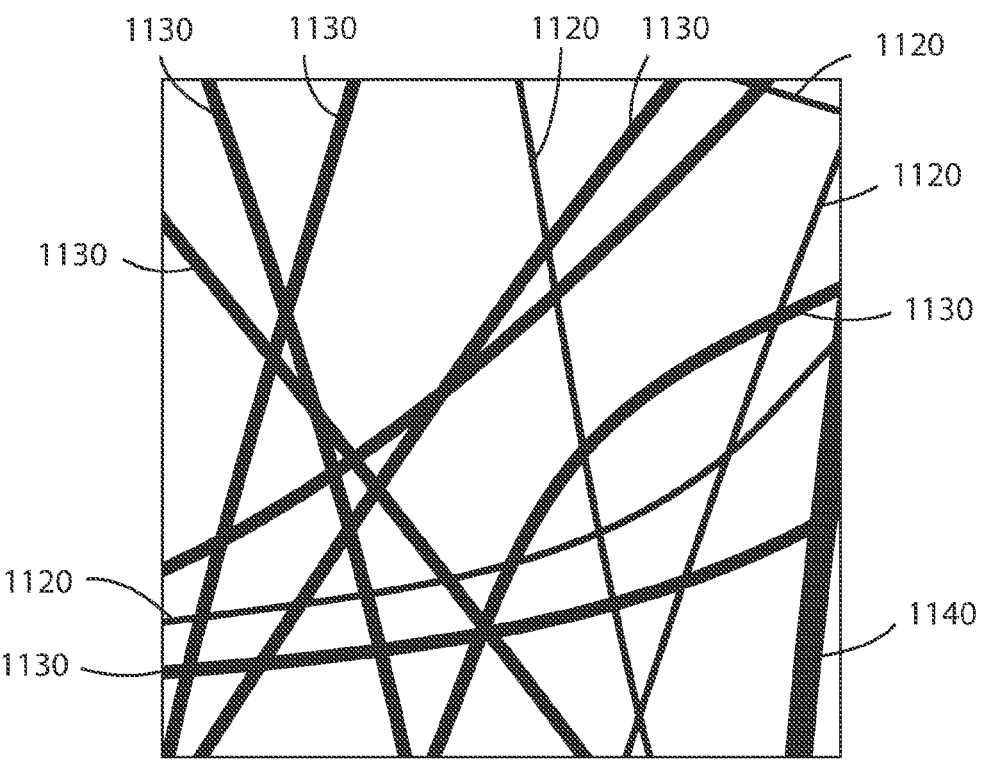
FIG. 11    CLOSEUP B
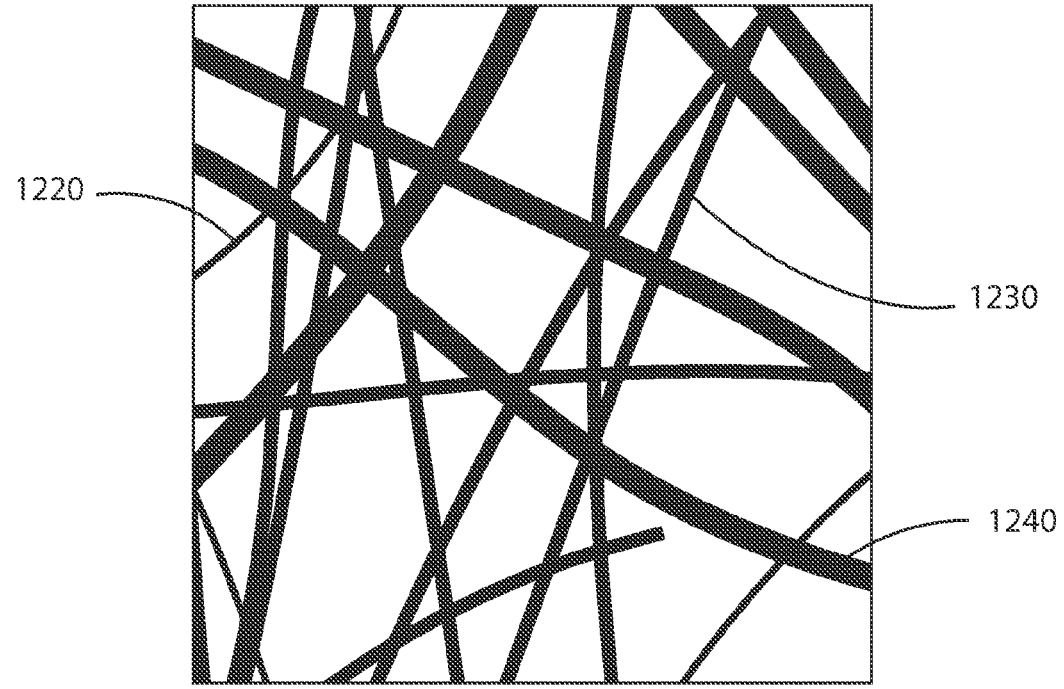
FIG. 12    CLOSEUP C

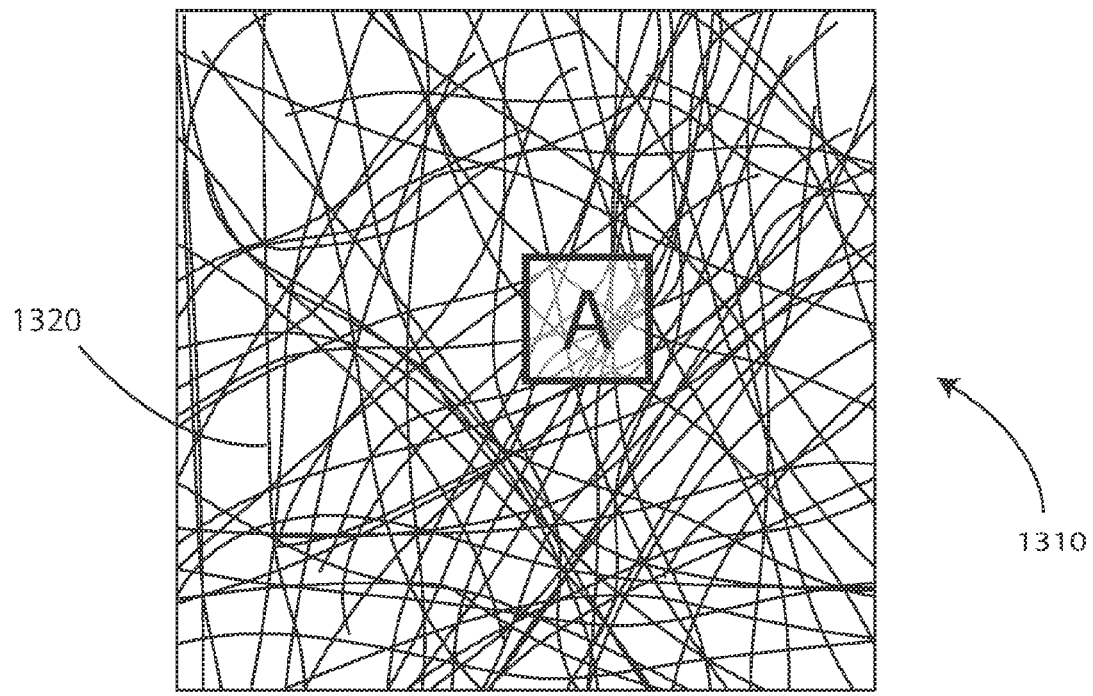
FIG. 13
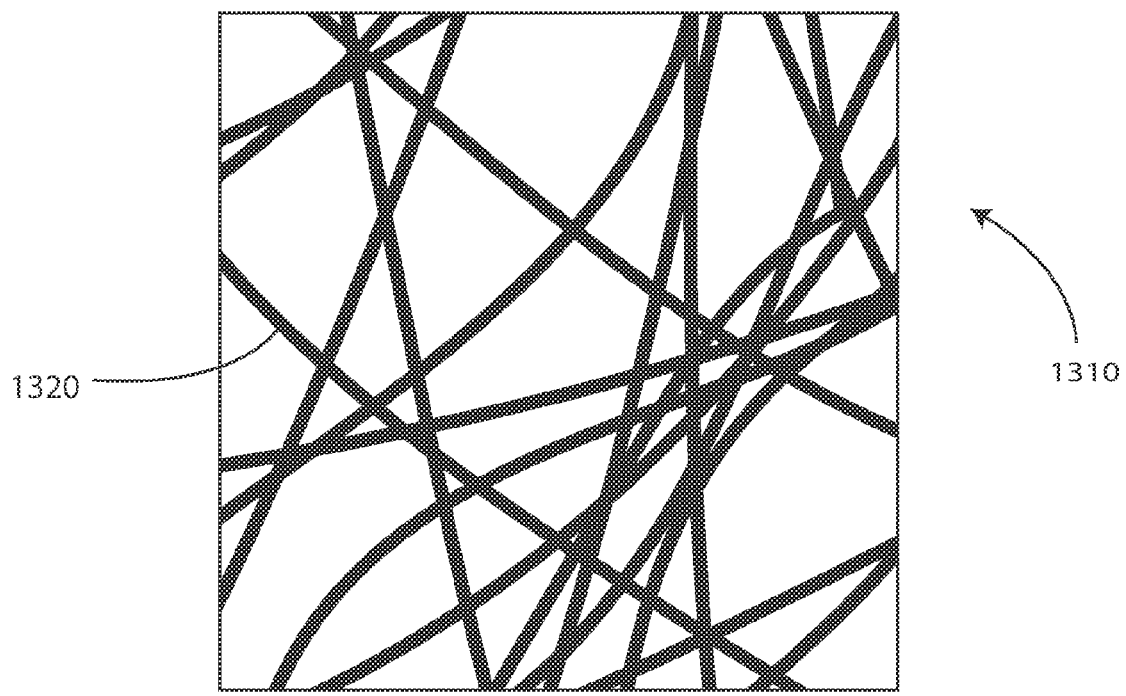
FIG. 14  CLOSEUP A

CLOSEUP A

HIGH EFFICIENCY FILTER MEDIA

CROSS-REFERENCE TO RELATED APPLICATIONS

This application is a 35 U.S.C. § 371 national phase application of PCT Application No. PCT/US2021/023975 (WO 2021/195275 A1), filed on Mar. 24, 2021, which claims the benefit of U.S. Provisional Application No. 62/994,262, filed on Mar. 24, 2020, each of which is incorporated herein by reference in its entirety.

This application is being filed as a PCT International Patent application on Mar. 24, 2021 in the name of Donaldson Company, Inc., a U.S. national corporation, applicant for the designation of all countries and Rakesh K. Yadav, a Citizen of India, Daniel L. Tuma, Robert R. Levac, Byron G. Griffin and Jonathan M. Beckett, Citizens of the U.S., Anil Suthar, a Citizen of India, and Robert J. Pannepacker, Jr., a Citizen of the U.S., inventors for the designation of all countries and claims priority to U.S. Provisional Patent Application No. 62/994,262, filed Mar. 24, 2020, the content of which is herein incorporated by reference in its entirety.

FIELD

Embodiments herein relate to filter media, filter media packs, and filter elements.

BACKGROUND

High efficiency filtration, including high efficiency particulate air (HEPA) filtration, is desirable for many applications, in particular for applications where removal of various small particulates (including, but limited to, particles from engine combustion, fires, dust, microbes and other pathogens, viruses, etc.) is desirable. For example, it is often desirable to have HEPA filtration of air circulating within an aircraft cabin.

Although various HEPA filtration products exist, there remains a need for improved HEPA filtration media, media packs, and filter elements.

SUMMARY

The present application is directed to filter media, filter media packs, and filter elements. In an embodiment, a filtration media pack has a plurality of layers of single facer media wherein the layers of single facer media include a fluted sheet, a facing sheet, and a plurality of flutes extending between the fluted sheet and the facing sheet and having a flute length extending from a first face of the filtration media pack to a second face of the filtration media pack. A first portion of the plurality of flutes is closed to unfiltered fluid flowing into the first portion of the plurality of flutes, and a second portion of the plurality of flutes is closed to unfiltered fluid flowing out of the second portion of the plurality of flutes so that fluid passing into one of the first face or the second face of the media pack and out the other of the first face or the second face of the media pack passes through media to provide filtration of the fluid. The fluted sheet and facing sheet are formed of multilayer media that can include a polytetrafluoroethylene (PTFE) layer supported by a polymeric scrim layer.

Generally, it is desirable that the polymeric scrim layer be relatively uniform in terms of surface irregularities (such as peak height of fibers relative to surrounding fibers), in terms of fiber diameter, and in terms of fiber distribution. This relative uniformity allows for improved support of the PTFE layer, which is typically quite thin and relatively fragile.

Maximum peak height of the polymeric scrim layer is thus preferably relatively small. In an embodiment, the polymeric scrim layer has an external maximum peak height $S_P$, measured between the highest peak and the mean plane, of less than 5µ-100µ.

Alternatively, in an embodiment, the polymeric scrim layer has an external maximum peak height $S_P$, measured between the highest peak and the mean plane, of greater than 5µ. In an embodiment, the polymeric scrim layer has an external maximum peak height $S_P$, measured between the highest peak and the mean plane, of less than 100µ.

In an embodiment, the polymeric scrim layer has an external maximum peak height $S_P$, measured between the highest peak and the mean plane, of less than 80µ. In an embodiment, the polymeric scrim layer has an external maximum peak height $S_P$, measured between the highest peak and the mean plane, of less than 60µ. In an embodiment, the polymeric scrim layer has an external maximum peak height $S_P$, measured between the highest peak and the mean plane, of less than 50µ. In an embodiment, the polymeric scrim layer has an external maximum peak height $S_P$, measured between the highest peak and the mean plane, of less than 40µ. In an embodiment, the polymeric scrim layer has an external maximum peak height $S_P$, measured between the highest peak and the mean plane, of less than 30µ. In an embodiment, the polymeric scrim layer has an external maximum peak height $S_P$, measured between the highest peak and the mean plane, of less than 20µ.

In an embodiment, the polymeric scrim layer has an external root mean square height $S_q$, of less than 100µ according to the formula:

$$Sq = \sqrt{\frac{1}{A}\int\int_A z^2(x, y)dxdy}$$

In an embodiment, the polymeric scrim layer has an external root mean square height $S_q$, of less than 75µ; of less than 50µ; of less than 40µ; of less than 35µ; or less than 20µ.

In an embodiment, the polymeric scrim layer has an external arithmetical mean height $S_a$ of less than 100µ according to the following formula:

$$Sa = \frac{1}{A}\int\int_A |z(x, y)|dxdy$$

In an embodiment, the polymeric scrim layer has an external arithmetical mean height $S_a$ of less than 75µ; the polymeric scrim layer has an external arithmetical mean height $S_a$ of less than 60µ; the polymeric scrim layer has an external arithmetical mean height $S_a$ of less than 50µ; the polymeric scrim layer has an external arithmetical mean height $S_a$ of less than 40µ; the polymeric scrim layer has an external arithmetical mean height $S_a$ of less than 30µ; or the polymeric scrim layer has an external arithmetical mean height $S_a$ of less than 20µ;

It is typically desirable to have the fibers of the polymeric scrim layer be relatively uniformly distributed. In an embodiment, the polymeric scrim layer has fibers having a uniformity of distribution of measured as variance from the mean density of −1.0 to −0.25 as measured by the following formula:

$$\text{Index of Dispersion, } I_d = \frac{\sigma^2}{\mu}$$

according to "Nonwoven Uniformity—Measurements using Image Analysis by Rajev Chhabra, 50 INJ Spring 2003, incorporated herein by reference.

In an embodiment, the polymeric scrim layer has fibers having a uniformity of distribution of −1 to −0.5. In embodiments the polymeric scrim layer has fibers having a uniformity of distribution of greater than −1.5; alternatively, the polymeric scrim layer has fibers having a uniformity of distribution of greater than −2.0; alternatively, the polymeric scrim layer has fibers having a uniformity of distribution of greater than −3.0.

In embodiments, the polymeric scrim layer has fibers having a uniformity of contact points of less than 2.0 of less than 1.5, of less than 1.0, or less than 1.0. In an embodiment, the polymeric scrim layer has fibers having a uniformity of contact points 0.5 to 2.5. In an embodiment, the polymeric scrim layer has fibers having a uniformity of contact points 1.0 to 2.0. Uniformity of Contact Points can be measured in accordance with MEASUREMENT OF THE UNIFORMITY OF THERMALLY BONDED POINTS IN POLYPROPYLENE SPUNBONDED NON-WOVENS USING IMAGE PROCESSING AND ITS RELATIONSHIP WITH THEIRTENSILE PROPERTIES by Mina Emadi et al., AUTEX Research Journal, Vol. 18, No. 4, December 2018 (incorporated herein by reference).

In an embodiment, the multi-layer media has air permeability of 2.0 to 3.0 cubic feet per minute (CFM); in an embodiment, the multi-layer media has air permeability of 1.5 to 4.0 cubic feet per minute (CFM); in an embodiment, the multi-layer media has air permeability of 1.0 to 5.0 cubic feet per minute (CFM), in an embodiment, the multi-layer media has air permeability of 0.5 to 6.0 cubic feet per minute (CFM), in an embodiment, the multi-layer media has air permeability of greater than 2.0 cubic feet per minute (CFM), in an embodiment, the multi-layer media has air permeability of greater than 2.5 cubic feet per minute (CFM), in an embodiment, the multi-layer media has air permeability of greater than 3.0 cubic feet per minute (CFM); in an embodiment, the multi-layer media has air permeability of greater than 4.0 cubic feet per minute (CFM), and in an embodiment, the multi-layer media has air permeability of greater than 5.0 cubic feet per minute (CFM).

In an embodiment, the filter pack has efficiency of 99.97 percent of 3 micron particles at a flow rate of 1200 cfm through the media pack. In an embodiment, the filter pack has an efficiency of 99.97 percent of 3 micron particles at a flow rate of 800 cfm through the media pack. In an embodiment, the filter pack has an efficiency of 99.97 percent of 3 micron particles at a flow rate of 1600 cfm through the media pack. In an embodiment, the filter pack has an efficiency of 99.97 percent of 3 micron particles at a flow rate of 2400 cfm through the media pack. In an embodiment, the filter pack has an efficiency of 99.97 percent of 3 micron particles at a flow rate of 3000 cfm through the media pack.

In an embodiment, the filter pack has an efficiency of 99.97 percent of 3 micron particles at a face velocity of 5 to 25 feet per minute. In an embodiment, the filter pack has an efficiency of 99.97 percent of 3 micron particles at a face velocity of 5 feet per minute. In an embodiment, the filter pack has an efficiency of 99.97 percent of 3 micron particles at a face velocity of 10 feet per minute. In an embodiment, the filter pack has an efficiency of 99.97 percent of 3 micron particles at a face velocity of 15 feet per minute. In an embodiment, the filter pack has an efficiency of 99.97 percent of 3 micron particles at a face velocity of 20 feet per minute. In an embodiment, the filter pack has an efficiency of 99.97 percent of 3 micron particles at a face velocity of 25 feet per minute. In an embodiment, the filter pack has an efficiency of 99.97 percent of 3 micron particles at a face velocity of 30 feet per minute.

In an embodiment, the multi-layer media has a thickness of 6 to 9 mils. In an embodiment, the multi-layer media has a thickness of 5 to 10 mils. In an embodiment, the multi-layer media has a thickness of 4 to 11 mils. In an embodiment, the multi-layer media has a thickness of 3 to 15 mils. In an embodiment, the multi-layer media has a thickness of less than 22 mils; less than 15 mils, less than 12 mils, less than 9 mils, less than 7 mils, less than 6 mils, or less than 5 mils.

In an embodiment, the multi-layer media has a bubble point of 6 to 10 psi. In an embodiment, the multi-layer media has a bubble point of 5 to 11 psi. In an embodiment, the multi-layer media has a bubble point of 4 to 12 psi.

In an embodiment, the PTFE includes expanded PTFE (ePTFE).

In an embodiment, the PTFE has an average pore size of 1.0 to 5.0 microns.

In an embodiment, the polymeric scrim includes spunbond fibers. In an embodiment, the spunbond fibers include polyester fibers.

In an embodiment, the fibers are substantially uniformly distributed.

In an embodiment, the polymeric scrim layer has a basis weight of 0.5 to 1.0 ounces per square yard. In an embodiment, the polymeric scrim layer has a basis weight of 0.6 to 0.9 ounces per square yard. In an embodiment, the polymeric scrim layer has a basis weight of greater than 0.5 ounces per square yard. In an embodiment, the polymeric scrim layer has a basis weight of less than 1.5 ounces per square yard. In an embodiment, the polymeric scrim layer has a basis weight of less than 2.0 ounces per square yard.

In an embodiment, the polymeric scrim layer has a thickness of 6 mils. In an embodiment, the polymeric scrim layer has a thickness of 4 to 8 mils. In an embodiment, the polymeric scrim layer has a thickness of 3 to 10 mils. In an embodiment, the polymeric scrim layer has a thickness of less than 12 mils. In an embodiment, the polymeric scrim layer has a thickness of less than 14 mils. In an embodiment, the polymeric scrim layer has a thickness of less than 16 mils.

In an embodiment, the polymeric scrim layer has a frazier air permeability of 800 to 900 cfm/ft$^2$ at 0.5 inches of water. In an embodiment, the polymeric scrim layer has a frazier air permeability of 700 to 1,000 cfm/ft$^2$ at 0.5 inches of water. In an embodiment, the polymeric scrim layer has a frazier air permeability of 600 to 1,100 cfm/ft$^2$ at 0.5 inches of water. In an embodiment, the polymeric scrim layer has a frazier air permeability of 550 to 1,050 cfm/ft$^2$ at 0.5 inches of water. In an embodiment, the polymeric scrim layer has a frazier air permeability of 500 to 1.500 cfm/ft$^2$ at 0.5 inches of water. In an embodiment, the polymeric scrim layer has a frazier air permeability of greater than 500 cfm/ft$^2$ at 0.5 inches of water. In an embodiment, the polymeric scrim layer has a frazier air permeability of greater than 700 cfm/ft$^2$ at 0.5 inches of water. In an embodiment, the polymeric scrim layer has a frazier air permeability of greater than 900 cfm/ft$^2$ at 0.5 inches of water.

In an embodiment, the fibers are substantially uniformly distributed such that the standard deviation of fiber spacing is from 0.5 to 1.0. In an embodiment, the fibers are substantially uniformly distributed such that the standard deviation of fiber spacing is from 0.6 to 0.9. In an embodiment, the fibers are substantially uniformly distributed such that the standard deviation of fiber spacing is from 0.7 to 0.8. In an embodiment, the fibers are substantially uniformly distributed such that the standard deviation of fiber spacing is from 0.25 to 1.0.

In an embodiment, the filter media can further include an additional layer between the PTFE layer and polymeric scrim layer. In an embodiment, the additional layer includes polypropylene or polyethylene. In an embodiment, the polymeric scrim layer further includes cellulose.

In an embodiment, the PTFE has a thickness of 6 to 10 mils. In an embodiment, the PTFE has a thickness of 4 to 12 mils. In an embodiment, the PTFE has a thickness of 7 to 9 mils. In an embodiment, the PTFE has a thickness of 2 to 14 mils. In an embodiment, the PTFE has a thickness of 5 to 10 mils. In an embodiment, the PTFE has a thickness of greater than 4 mils. In an embodiment, the PTFE has a thickness of greater than 5 mils. In an embodiment, the PTFE has a thickness of greater than 6 mils. In an embodiment, the PTFE has a thickness of greater than 7 mils.

In an embodiment, the PTFE has a thickness of less than 9 mils. In an embodiment, the PTFE has a thickness of less than 10 mils. In an embodiment, the PTFE has a thickness of less than 12 mils. In an embodiment, the PTFE has a thickness of less than 15 mils. In an embodiment, the PTFE has a thickness of less than 20 mils.

In an embodiment, the PTFE has an air perm of 200 to 300 cfm/ft$^2$. In an embodiment, the PTFE has an air perm of 150 to 350 cfm/ft$^2$. In an embodiment, the PTFE has an air perm of 100 to 400 cfm/ft$^2$. In an embodiment, the PTFE has an air perm of 500 to 500 cfm/ft$^2$. In an embodiment, the PTFE has an air perm of greater than 100 cfm/ft$^2$.

In an embodiment, the PTFE has an air perm of greater than 125 cfm/ft$^2$. In an embodiment, the PTFE has an air perm of greater than 150 cfm/ft$^2$. In an embodiment, the PTFE has an air perm of greater than 200 cfm/ft$^2$. In an embodiment, the PTFE has an air perm of greater than 225 cfm/ft$^2$. In an embodiment, the PTFE has an air perm of less than 275 cfm/ft$^2$; an air perm of less than 300 cfm/ft$^2$; an air perm of less than 350 cfm/ft$^2$; an air perm of less than 400 cfm/ft$^2$; an air perm of less than 500 cfm/ft$^2$; or an air perm of less than 1000 cfm/ft$^2$.

In some embodiments the PTFE has a mullen burst of 25 to 75 psi; alternatively, in some embodiments the PTFE has a mullen burst of 10 to 90 psi; a mullen burst of 10 to 100 psi; a mullen burst of less than 125 psi; a mullen burst of less than 150 psi; or a mullen burst of less than 200 psi.

In an embodiment the PTFE has a strip tensile strength (MD/CD, kg/5 cm) of 60/48. In an embodiment, the PTFE has a strip tensile strength (MD/CD, kg/5 cm) of 40 to 80/40 to 60; alternatively, in an embodiment, the PTFE has a strip tensile strength (MD/CD, kg/5 cm) of 30 to 90/30 to 70; and alternatively, in an embodiment the PTFE has a strip tensile strength (MD/CD, kg/5 cm) of 20 to 100/20 to 80.

In an embodiment, the PTFE has a basis weight of 1.0 to 3.0 ounces per square yard; alternatively, in an embodiment, the PTFE has a basis weight of 1.5 to 2.5 ounces per square yard. In an embodiment, the PTFE has a basis weight of 0.5 to 3.0 ounces per square yard; alternatively, the PTFE has a basis weight of greater than 0.5 ounces per square yard. In an embodiment, the PTFE has a basis weight of greater than 1.0 ounces per square yard; of greater than 1.5 ounces per square yard; of less than 3.0 ounces per square yard; of less than 4.0 ounces per square yard; or less than 5.0 ounces per square yard.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which:

FIG. 11 is a closeup of region B from FIG. 9.

FIG. 12 is a closeup of region C from FIG. 9.

FIG. 13 is an illustration of a close-up of stylized filter media showing fibers of substantially unform diameters, also showing specific region A.

FIG. 14 is a closeup of region A from FIG. 13.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Figure 1:
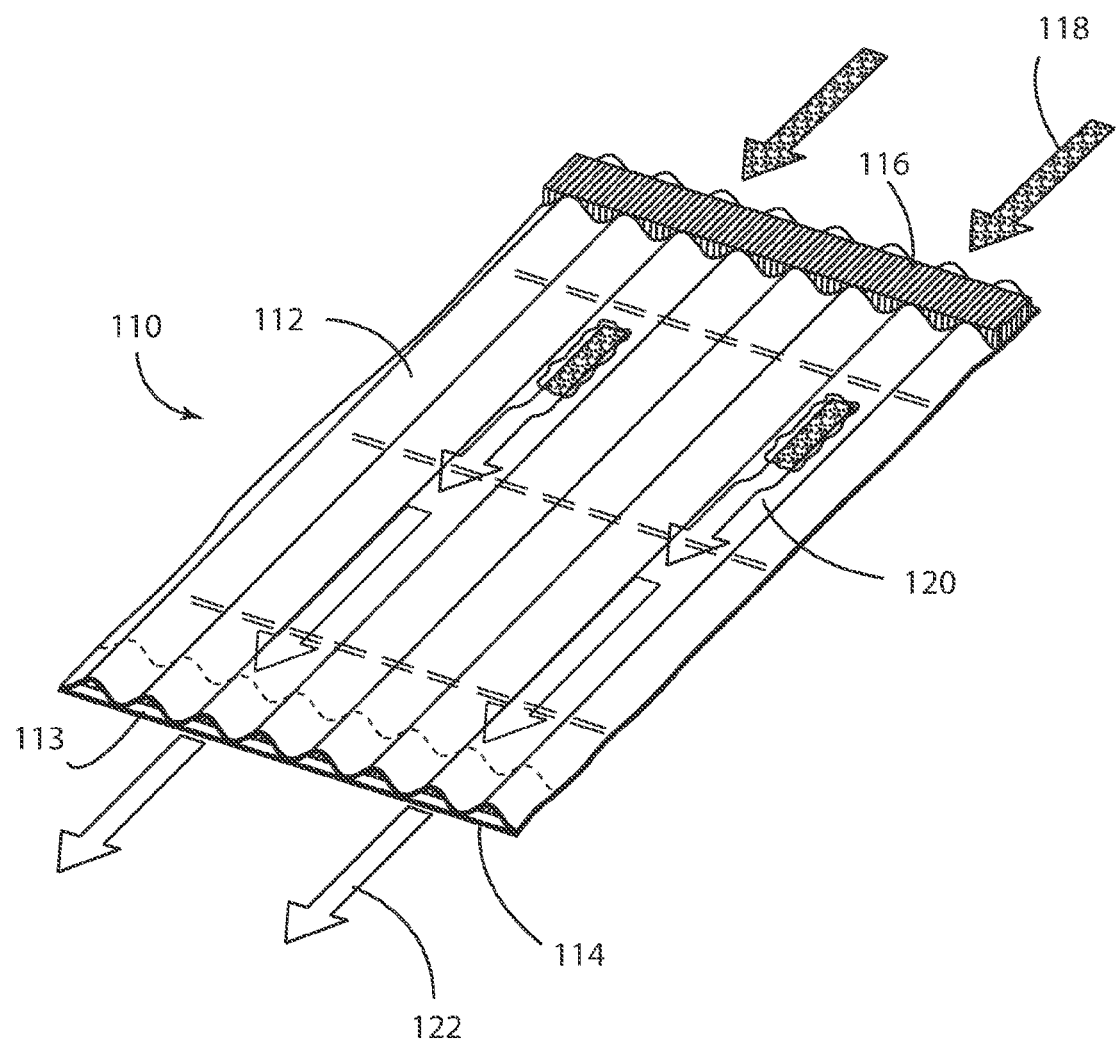
FIG. 1 is a perspective view of piece of single-facer z-flow media made in accordance with various embodiments herein.

FIG. 1 is a perspective view of piece of single facer z-flow media 110 made in accordance with various embodiments herein. The single facer z-flow media 110 includes a fluted sheet 112 along with a facer sheet 114. The fluted sheet 112 includes a plurality of flutes 113 extending from one end of the single facer sheet to the other. A glue bead 116 or other obstruction is located on an end of the single facer z-flow media 110 and obstructs the flow of gases such that they have to enter specific flutes. An arrow 118 showing unfiltered air enters the flutes of the single facer z-flow media 110 and then passes through the flutes (such as at arrow 120) and travels along the outside of the flute as shown at arrow 122.

Figure 2:
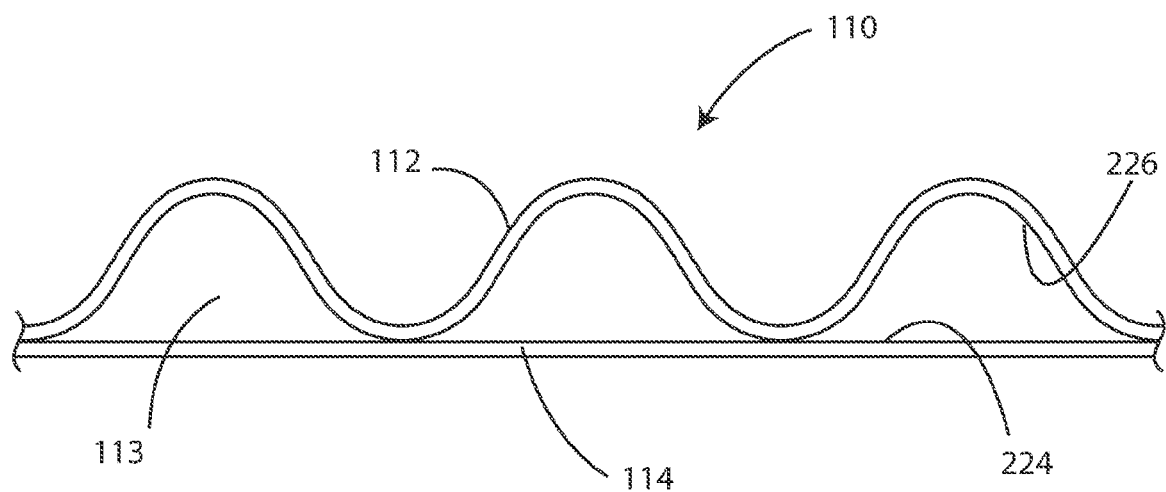
FIG. 2 is a cross sectional view of a portion of single-facer z-flow media made in accordance with various embodiments herein.

FIG. 2 is a cross sectional view of a portion of single facer z-flow media 110 made in accordance with various embodiments herein. The single facer z-flow media 110 includes the fluted sheet 112 and facer sheet 114, along with a flute 113. The fluted sheet 112 includes an interior surface 226, and the facer sheet 114 includes an interior surface 224. These interior surfaces 224 and 226 typically include an expanded polytetrafluoroethylene (PTFE) layer secured to a support scrim. The interior surface 224 and interior surface 226 are generally on the upstream side of the singer facer media (thus are on the side receiving unfiltered air).

Figure 3:
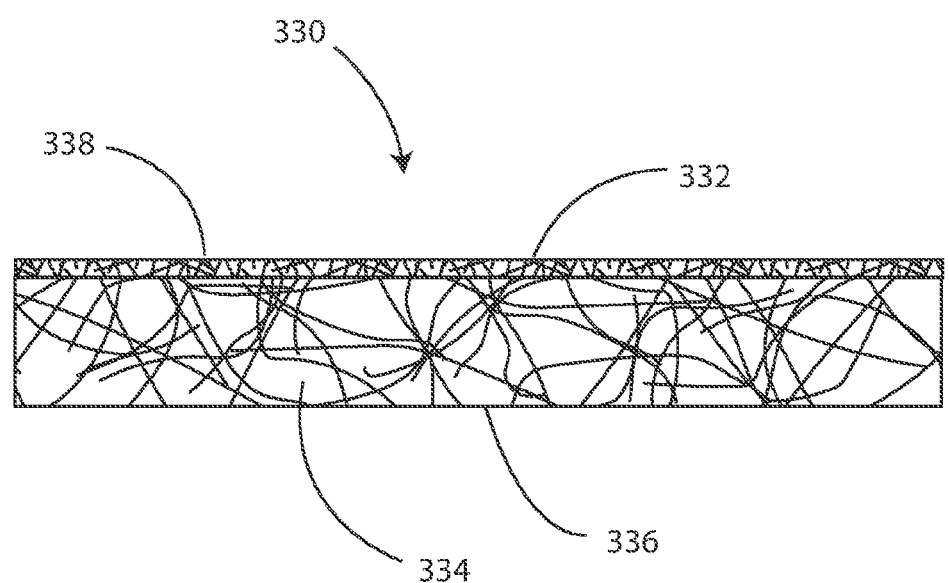
FIG. 3 is a schematic cross-sectional view of two-layer media construction made in accordance with various embodiments herein.

FIG. 3 is a schematic cross-sectional view of a two-layer media construction 330 made in accordance with various embodiments herein. The two-layer media construction 330 includes a support scrim 334 and an ePTFE layer 332. The surface 338 of the ePTFE layer typically forms the interior of a flute receiving unfiltered air; while a surface 336 of the support scrim 334 is positioned on the downstream side of the filter. It will be appreciated that typically the same media is used for both the fluted sheet and the facer sheet (see FIG. 1 and FIG. 2)

Figure 4:
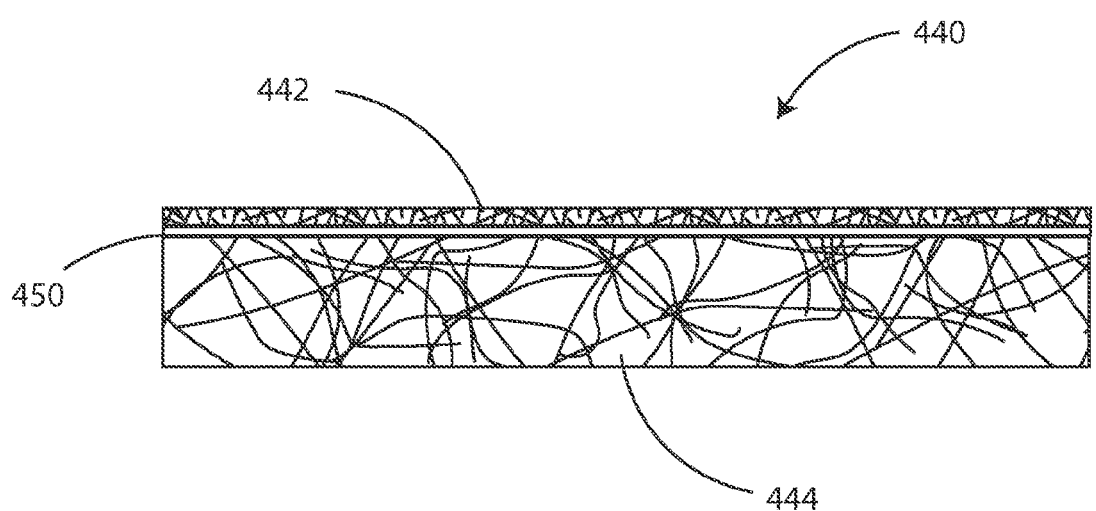
FIG. 4 is a schematic cross-sectional view of three-layer media in accordance with various embodiments herein.

FIG. 4 is a schematic cross-sectional view of a three-layer media 440 in accordance with various embodiments herein. In FIG. 3 a support scrim 444 and ePTFE layer 442 are secured to one another by an additional layer 450, such as a polypropylene or polyethylene layer.

Figure 5:
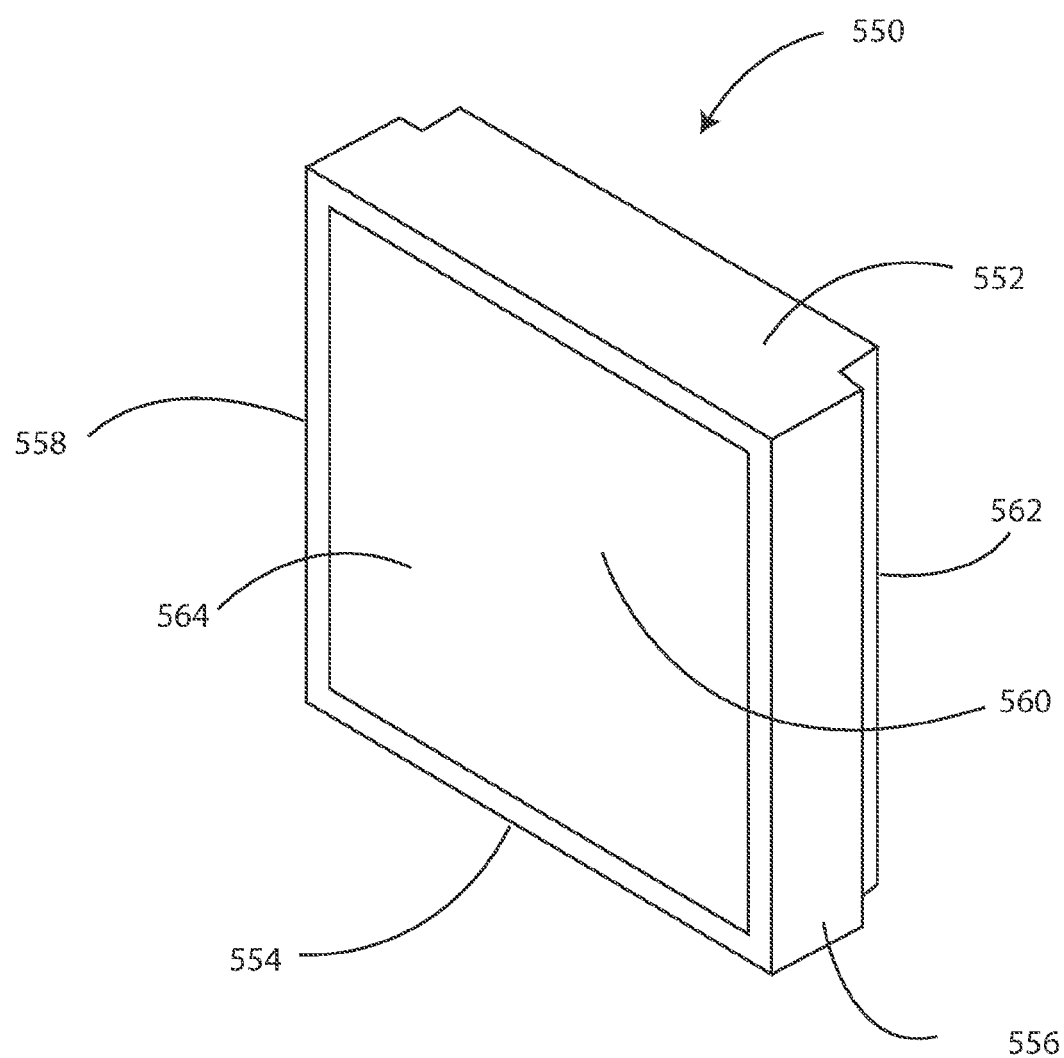
FIG. 5 is a perspective view of filter element in accordance with various embodiments herein.
Figure 6:
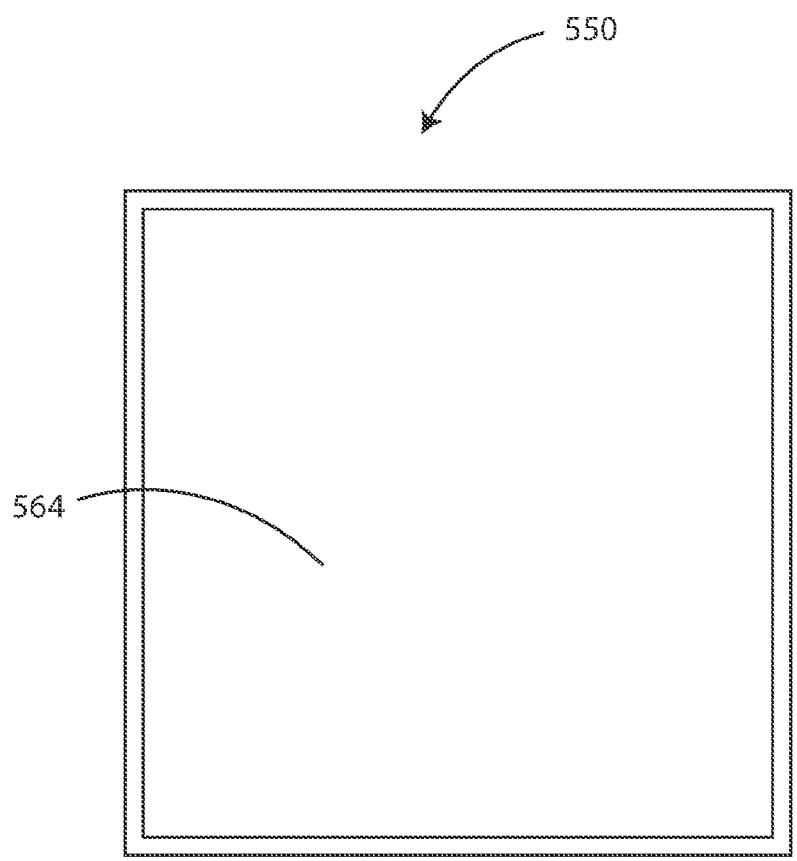
FIG. 6 is a front view of the filter element of FIG. 5 in accordance with various embodiments herein.

FIG. 5 is a perspective view of filter element 550 in accordance with various embodiments herein, the filter element 550 containing a filter media pack. The filter element 550 includes a top 552, a bottom 554, a first side 556, and a second side 558. The filter element 550 further includes a front 560 and a back 562. The front 560 includes an exposed surface 564 of the front of the z-flow media, which continues through the filter element 550 to the back 562. FIG. 6 is a front view of the filter element 550 of FIG. 5 in accordance with various embodiments herein.

Figure 7:
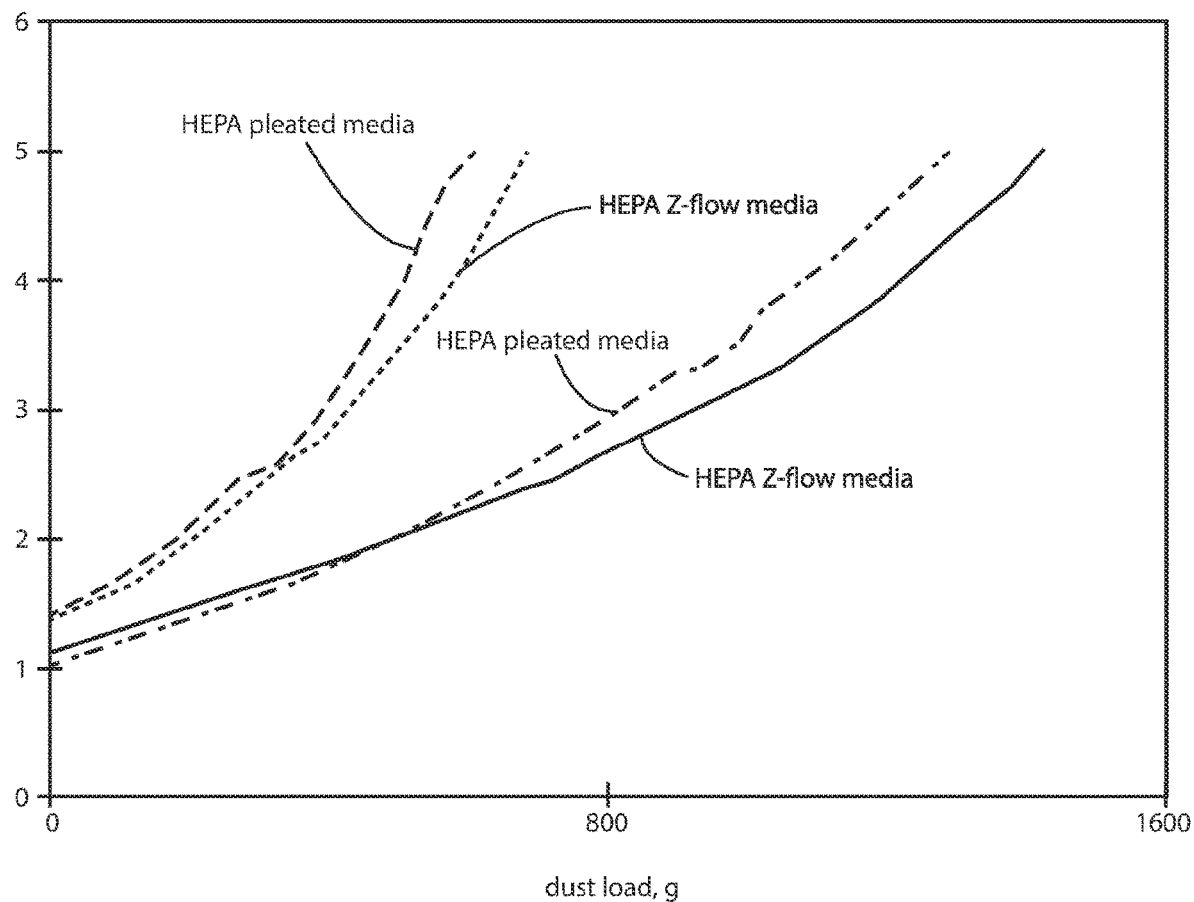
FIG. 7 is a chart showing relative performance between z-flow media containing an ePTFE layer and pleated HEPA media.

FIG. 7 is a chart showing relative performance between media containing an ePTFE layer and not containing an ePTFE layer. FIG. 5 shows how HEPA z-flow media has a longer life than an example pleated media.

Figure 8:
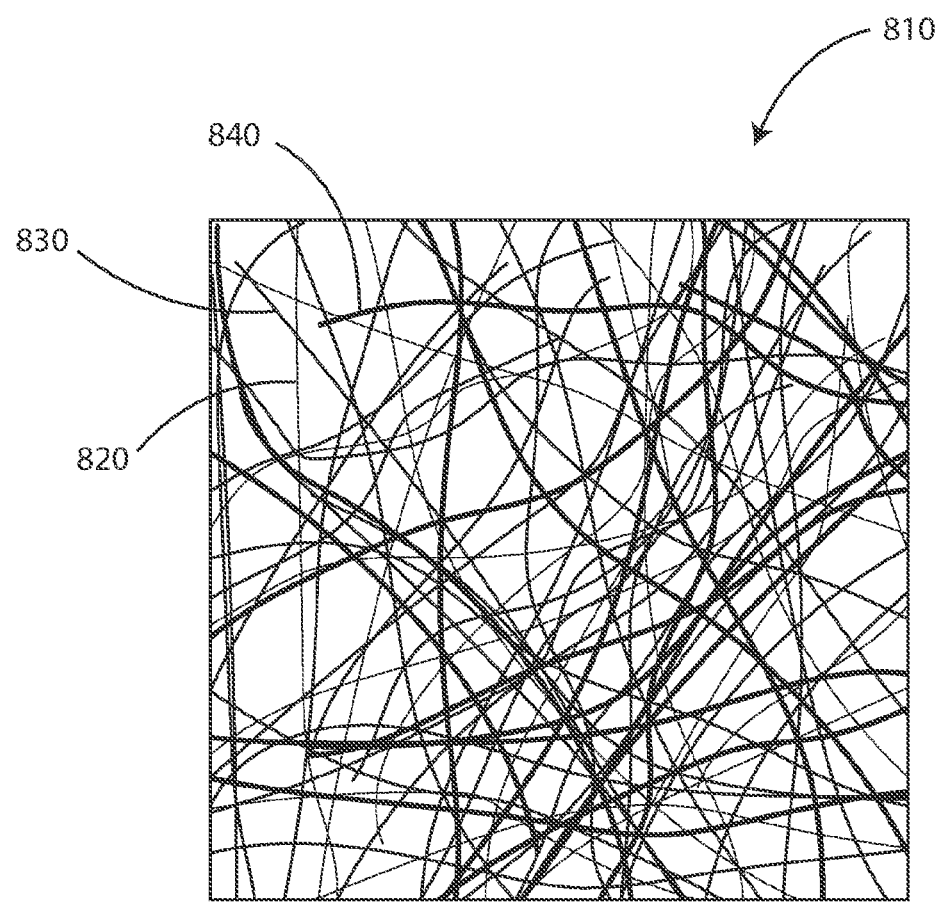
FIG. 8 is an illustration of a close-up of stylized filter media showing fibers of multiple diameters.

FIG. 8 is an illustration (not a photograph) of a close-up of stylized filter media 810 showing fibers of multiple diameters for the polymeric scrim support material. In the depicted figure, there thin fibers 820, medium fibers 830 and thick fibers 840. Generally, it is desirable to have fibers that are relatively uniform in size. The uniformity of size allows for better support of the PTFE layer, preserving integrity of the PTFE layer and avoiding degradation of the PTFE layer. In an embodiment the polymeric scrim layer has fibers having a mean diameter of 10 to 20μ and a standard deviation of less than 3μ; alternatively, the polymeric scrim layer has fibers having a mean diameter of 5 to 25μ and a standard deviation of less than 4μ; alternatively, the polymeric scrim layer has fibers having a mean diameter of 12 to 18μ and a standard deviation of less than 2 microns. Alternatively, the polymeric scrim layer has fibers have a standard deviation of less than 5μ, less than 4μ, less than 3μ, or less than 2μ.

Figure 9:
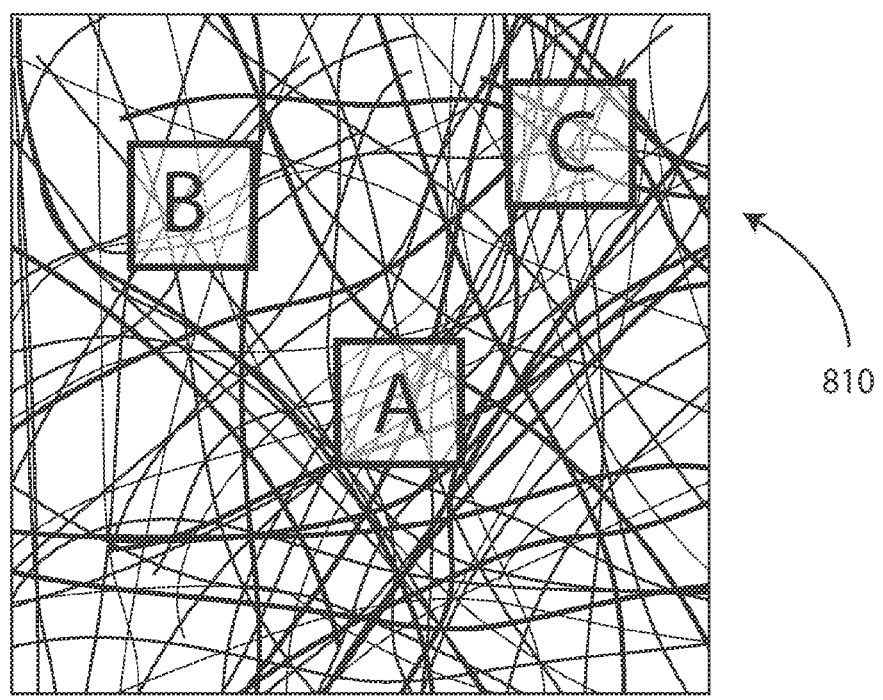
FIG. 9 is the illustration of FIG. 8, showing three specific regions A, B, and C for closeup views in FIGS. 10, 11, and 12, respectively.
Figure 10:
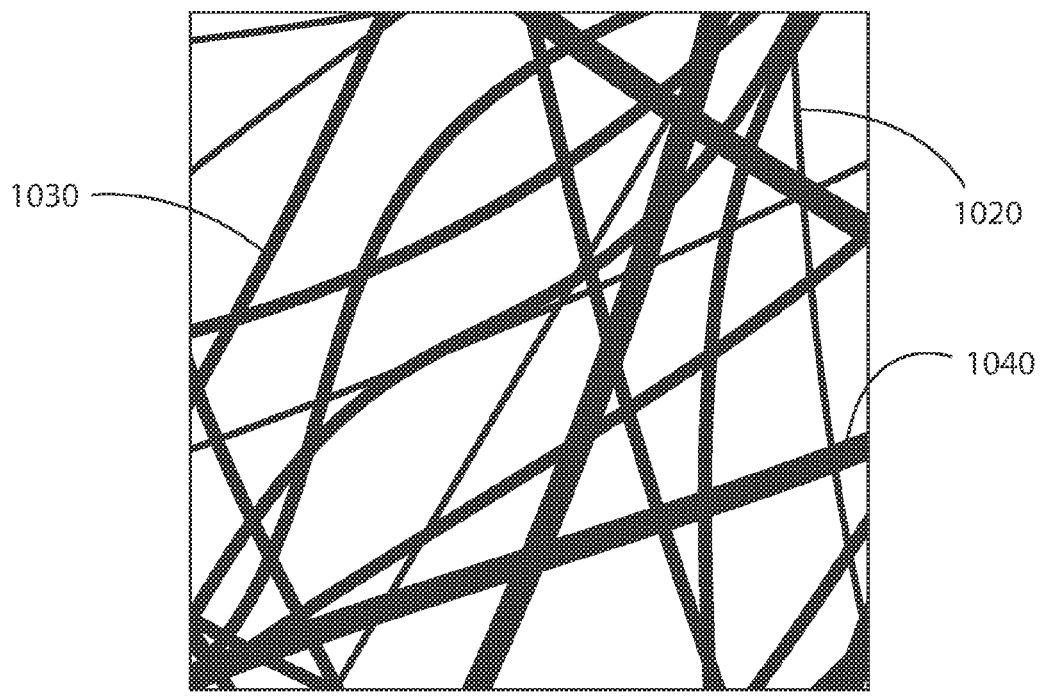
FIG. 10 is a closeup of region A from FIG. 9.

FIG. 9 is the illustration of FIG. 8, showing three specific regions A, B, and C for closeup views in FIGS. 10, 11, and 12, respectively. FIG. 9 specifically shows media 810 with the three regions A, B, and C superimposed on the filter media 810. In this case media 810 is polymeric scrim media.

Measurement of fiber diameter can be undertaken by selecting a region, such as region A, region B, or region C, and then measuring the number of fibers in that region and the diameter of each fiber to obtain a mean fiber diameter, and also allow for other statistical measures, such as median fiber diameter, mode fiber diameter, standard deviations, etc. The size of the regions used for these measures can be adjusted, but in general should be big enough to allow for a statistically meaningful sample size. Typically, at least 20 fibers should be shown in a measurement region, more typically at least 30 fibers, at least 40 fibers, or at least 50 fibers. It is possible to also use higher sample sizes, such as 50 to 500 fibers, 50 to 250 fibers, or 50 to 100 fibers. Also, it is possible to take multiple measurements across multiple regions and then combine the results, such as combining regions A, B, and C and averaging the results. Generally, it is desirable to try to have a large enough sample size to properly characterize the overall media properties.

Note that it is often desirable to measure the fiber sizes from the non-laminated side of the media, in other words from the side of the media that does not contain the PTFE, since this non-laminated side of the media will have visible fibers that are not obscured by the PTFE. Also, it is possible to deconstruct an element and take samples from exposed areas of the media, such as portions of the flat sheet forming the media, or portions of the corrugated media that have been flattened out.

It will be appreciated that not all portions of the media in a media pack or element need to meet the fiber diameter (or other parameters) requirement, but only a portion of the media must meet the requirement. Generally, the majority of the media will meet the requirement, and in some cases all of the media will meet the requirements, but in some cases less than the majority of the media will meet the requirements.

FIG. 10 is a closeup of region A from FIG. 9, showing small fibers 1020, medium fibers 1030, and large fibers 1040.

FIG. 11 is a closeup of region B from FIG. 9, showing small fibers 1120, medium fibers 1130, and large fibers 1140. For illustrative purposes each of the fibers have been labeled, with four small fibers 1120; six medium fibers 1130; and one large fiber 1140. A fiber that appears anywhere in the region is counted. If a fiber is continuous, but leaves the measurement region and reenters it, can be counted as two fibers. In this example, assuming the small fibers 1120 are 10 microns, the medium fibers 1130 are 20 microns, and the large fibers 1140 are 30 microns, the average diameter would be 17.3 microns.

FIG. 12 is a closeup of region C from FIG. 9, showing small fibers 1220; medium fibers 1230, and large fibers 1240.

FIG. 13 is an illustration of a close-up of stylized filter media 1320 showing fibers of substantially uniform diameters, also showing specific region A. FIG. 14 is a closeup of region A. The uniformity of size of the fibers is desirable in certain embodiments, since uniform fiber sizes can result in improved support of the PTFE layer.

Figure 15:
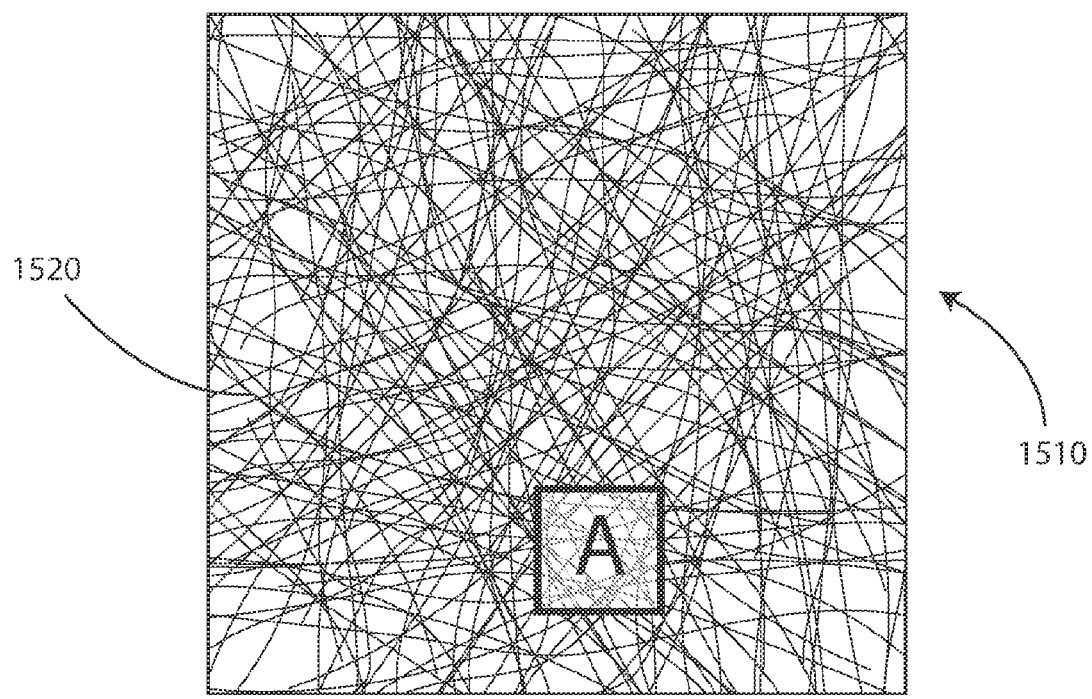
FIG. 15 is an illustration of a close-up of stylized filter media showing fibers of substantially unform diameters, also showing specific region A.

FIG. 15 is an illustration of a close-up of stylized filter media 1510 showing small fibers 1520 of substantially uniform diameters, also showing specific region A.

Figure 16:
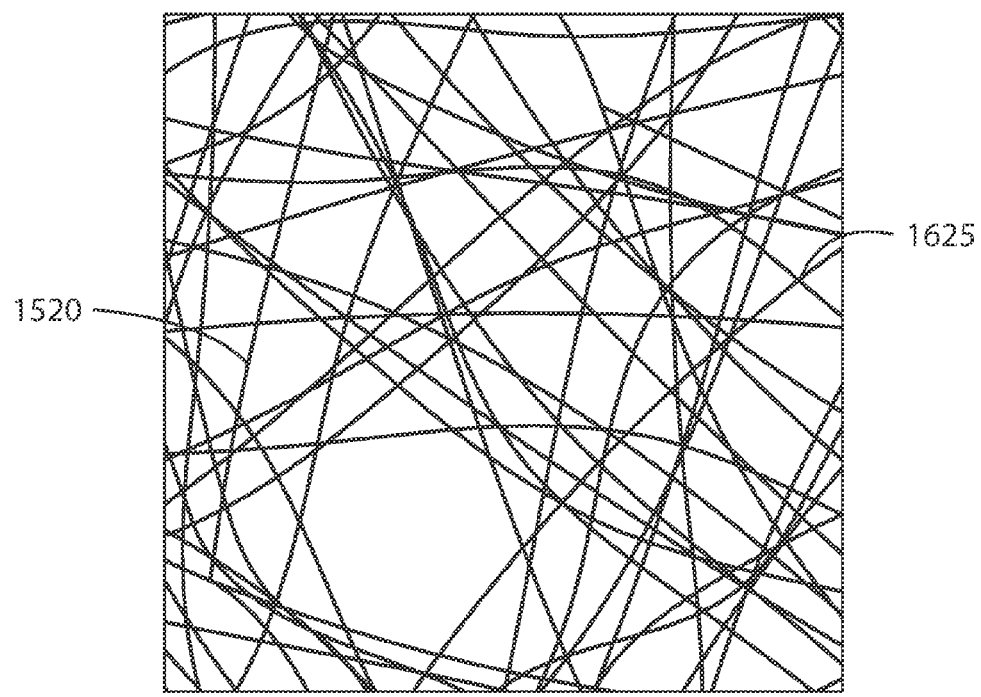
FIG. 16 is a closeup of region A from FIG. 15.

FIG. 16 is a closeup of region A from FIG. 15. Closeup region A also shows a contact point 1625, where two fibers cross with one another and make contact. In an embodiment, the polymeric scrim layer has fibers having a uniformity of contact points of less than 2.0 of less than 1.5, of less than 1.0, or less than 1.0. In an embodiment, the polymeric scrim layer has fibers having a uniformity of contact points 0.5 to 2.5. In an embodiment, the polymeric scrim layer has fibers having a uniformity of contact points 1.0 to 2.0.

Figure 17:
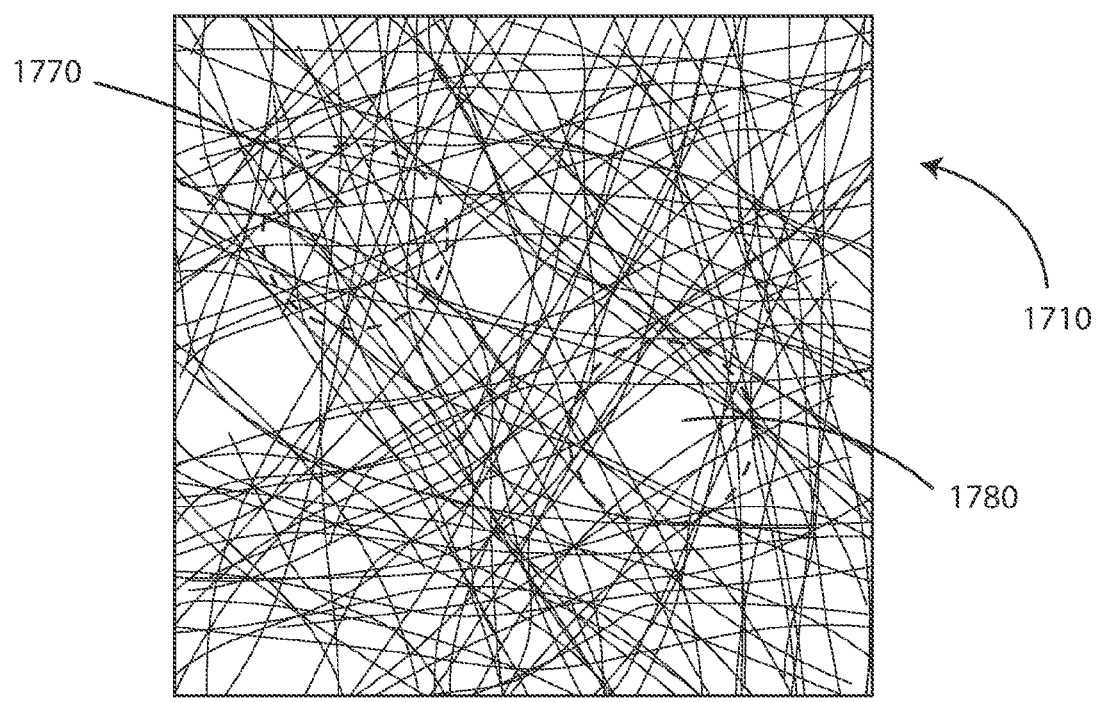
FIG. 17 is an illustration of a close-up of stylized filter media.

FIG. 17 is an illustration of a close-up of filter media 1710, showing example first region 1770 and second region 1780. First region 1770 has significantly more uniform distribution of polymeric scrim fibers than second region 1780, and this more uniform distribution is desired. In an embodiment, the polymeric scrim layer has fibers having a uniformity of distribution of measured as variance from the mean density of −1.0 to −0.25 as measured by the following formula:

$$\text{Index of Dispersion, } I_d = \frac{\sigma^2}{\mu}$$

In an embodiment, the polymeric scrim layer has fibers having a uniformity of distribution of −1 to −0.5. In an embodiment, the polymeric scrim layer has fibers having a uniformity of distribution of greater than −1.5; in an embodiment, the polymeric scrim layer has fibers having a uniformity of distribution of greater than −2.0; in an embodiment, the polymeric scrim layer has fibers having a uniformity of distribution of greater than −3.0; and in an embodiment, the polymeric scrim layer has fibers having a uniformity of contact points of less than 3.0.

Figure 18:
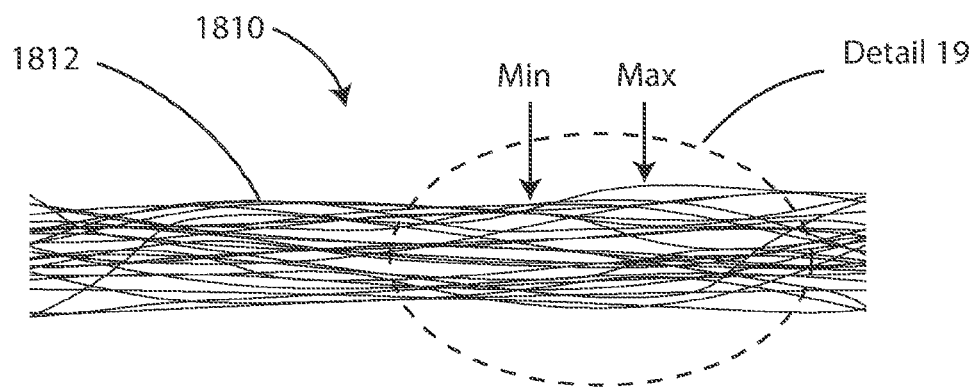
FIG. 18 is an illustration of a closeup side-cross sectional view of a polymeric scrim, showing aspects of the maximum and minimum heights of the top surface.
Figure 19:
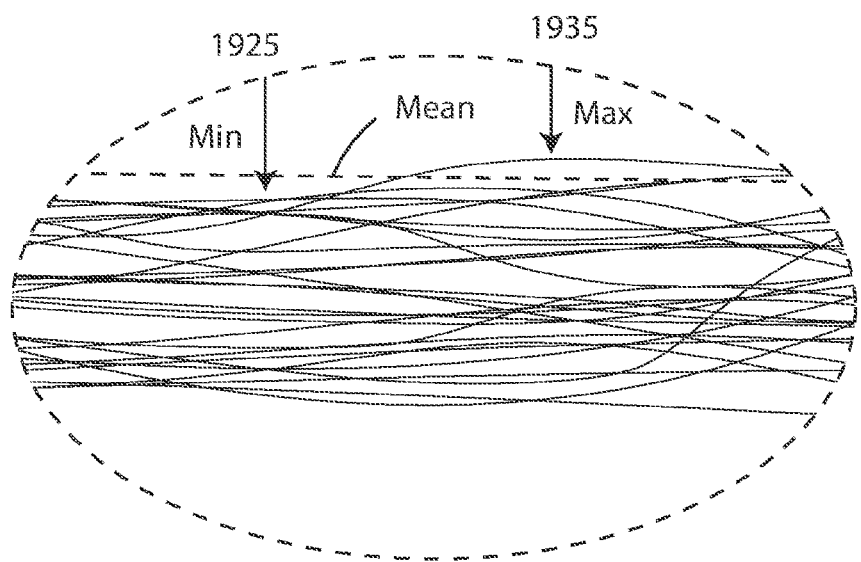
FIG. 19 is a closeup of Detail 19 from FIG. 18.

FIG. 18 is an illustration of a closeup side-cross sectional view of a polymeric scrim 1810, showing aspects of the maximum and minimum heights of the top surface 1812. FIG. 19 is a closeup of Detail 19 from FIG. 18, showing the minimum height 1925 of the top surface, as well as the maximum height 1935 of the top surface. An example mean height is also shown. In an embodiment, the polymeric scrim layer has an external maximum peak height $S_P$, measured between the highest peak and the mean plane, of than 5µ-100µ; alternatively, in an embodiment, the polymeric scrim layer has an external maximum peak height $S_P$, measured between the highest peak and the mean plane, of greater than 5µ.

In an embodiment, the polymeric scrim layer has an external maximum peak height $S_P$, measured between the highest peak and the mean plane, of less than 100µ. In an embodiment, the polymeric scrim layer has an external maximum peak height $S_P$, measured between the highest peak and the mean plane, of less than 80µ. In an embodiment, the polymeric scrim layer has an external maximum peak height $S_P$, measured between the highest peak and the mean plane, of less than 60µ. In an embodiment, the polymeric scrim layer has an external maximum peak height $S_P$, measured between the highest peak and the mean plane, of less than 50µ. In an embodiment, the polymeric scrim layer has an external maximum peak height $S_P$, measured between the highest peak and the mean plane, of less than 40µ. In an embodiment, the polymeric scrim layer has an external maximum peak height $S_P$, measured between the highest peak and the mean plane, of less than 30µ. In an embodiment, the polymeric scrim layer has an external maximum peak height $S_P$, measured between the highest peak and the mean plane, of less than 20µ.

In an embodiment, the polymeric scrim layer has an external root mean square height $S_q$, of less than 100µ according to the formula:

$$Sq = \sqrt{\frac{1}{A}\int\int_A z^2(x,y)dxdy}$$

In an embodiment, the polymeric scrim layer has an external root mean square height $S_q$, of less than 75µ; of less than 50µ; of less than 40µ; of less than 35µ; or of less than 20µ. In an embodiment, the polymeric scrim layer has an external arithmetical mean height $S_a$ of less than 100µ according to the following formula:

$$Sa = \frac{1}{A}\int\int_A |z(x,y)|dxdy$$

In an embodiment, the polymeric scrim layer has an external arithmetical mean height $S_a$ of less than 75µ; the polymeric scrim layer has an external arithmetical mean height $S_a$ of less than 60µ; the polymeric scrim layer has an external arithmetical mean height $S_a$ of less than 50µ; the polymeric scrim layer has an external arithmetical mean height $S_a$ of less than 40µ; the polymeric scrim layer has an external arithmetical mean height $S_a$ of less than 30µ; or the polymeric scrim layer has an external arithmetical mean height $S_a$ of less than 20µ.

Figure 20:
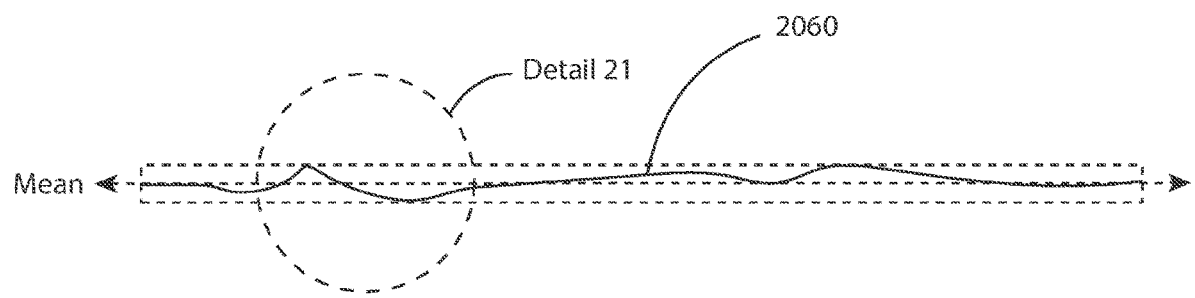
FIG. 20 is an illustration showing heights of a PTFE top surface.
Figure 21:
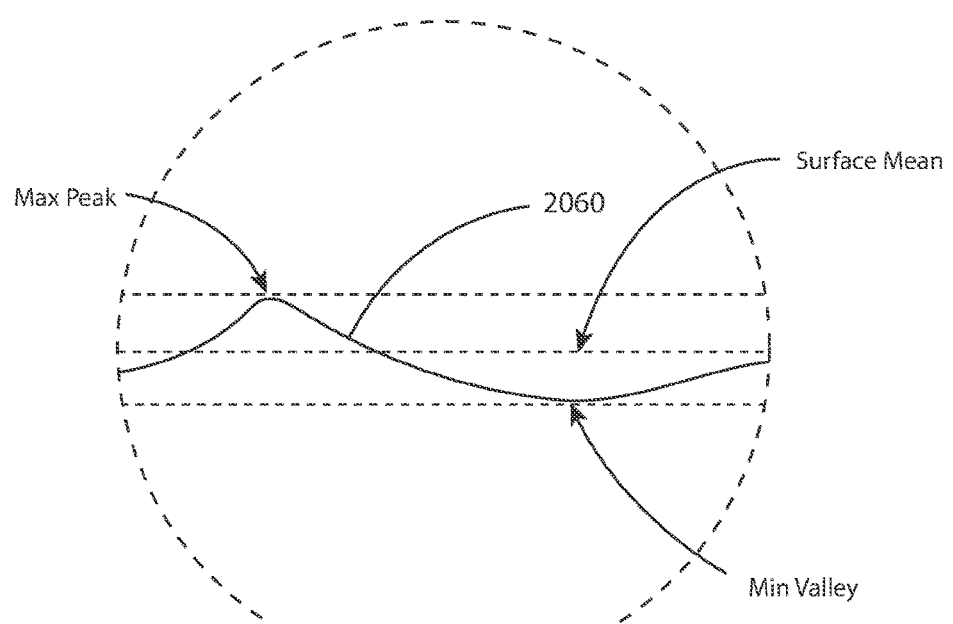
FIG. 21 is a closeup of Detail 21 from FIG. 20.

FIG. 20 is an illustration showing heights of a PTFE top surface 2060, and FIG. 21 is a closeup of Detail 21 from FIG. 20. The max peak is shown, along with minimum valley, and a mean value.

In an embodiment, a filtration media pack is included having (a) a plurality of layers of single facer media wherein the layers of single facer media include a fluted sheet, a facing sheet, and a plurality of flutes extending between the fluted sheet and the facing sheet and having a flute length extending from a first face of the filtration media pack to a second face of the filtration media pack, (b) a first portion of the plurality of flutes being closed to unfiltered fluid flowing into the first portion of the plurality of flutes, and a second portion of the plurality of flutes being closed to unfiltered fluid flowing out of the second portion of the plurality of flutes so that fluid passing into one of the first face or the second face of the media pack and out the other of the first face or the second face of the media pack passes through media to provide filtration of the fluid, wherein the fluted sheet and facing sheet formed of multi-layer media can include a polytetrafluoroethylene (PTFE) layer supported by a polymeric scrim layer.

In an embodiment, the multi-layer media has air permeability of 2.0 to 3.0 cubic feet per minute (CFM). In an embodiment, wherein the multi-layer media has air permeability of 1.5 to 4.0 cubic feet per minute (CFM). In an embodiment, wherein the multi-layer media has air permeability of 1.0 to 5.0 cubic feet per minute (CFM). In an embodiment, wherein the multi-layer media has air permeability of 0.5 to 6.0 cubic feet per minute (CFM). In an embodiment, wherein the multi-layer media has air permeability of greater than 2.0 cubic feet per minute (CFM). In an embodiment, wherein the multi-layer media has air permeability of greater than 2.5 cubic feet per minute (CFM). In an embodiment, wherein the multi-layer media has air permeability of greater than 3.0 cubic feet per minute (CFM). In an embodiment, wherein the multi-layer media has air permeability of greater than 4.0 cubic feet per minute (CFM). In an embodiment, wherein the multi-layer media has air permeability of greater than 5.0 cubic feet per minute (CFM).

In an embodiment, the filter pack has efficiency of 99.97 percent of 3 micron particles at a flow rate of 1200 cfm through the media pack. In an embodiment, the filter pack has efficiency of 99.97 percent of 3 micron particles at a flow rate of 800 cfm through the media pack. In an embodiment, the filter pack has efficiency of 99.97 percent of 3 micron particles at a flow rate of 1600 cfm through the media pack. In an embodiment, the filter pack has efficiency of 99.97 percent of 3 micron particles at a flow rate of 2400 cfm through the media pack. In an embodiment, wherein the filter pack has efficiency of 99.97 percent of 3 micron particles at a flow rate of 3000 cfm through the media pack. In an embodiment, wherein the filter pack has efficiency of 99.97 percent of 3 micron particles at a face velocity of 5 to 25 feet per minute.

In an embodiment, the filter pack has efficiency of 99.97 percent of 3 micron particles at a face velocity of 5 feet per minute. In an embodiment, wherein the filter pack has efficiency of 99.97 percent of 3 micron particles at a face velocity of 10 feet per minute. In an embodiment, wherein the filter pack has efficiency of 99.97 percent of 3 micron particles at a face velocity of 15 feet per minute. In an embodiment, wherein the filter pack has efficiency of 99.97 percent of 3 micron particles at a face velocity of 20 feet per minute. In an embodiment, wherein the filter pack has efficiency of 99.97 percent of 3 micron particles at a face velocity of 25 feet per minute.

In an embodiment, wherein the filter pack has efficiency of 99.97 percent of 3 micron particles at a face velocity of 30 feet per minute. In an embodiment, wherein the multi-layer media has a thickness of 6 to 9 mils. In an embodiment, wherein the multi-layer media has a thickness of 5 to 10 mils. In an embodiment, wherein the multi-layer media has a thickness of 4 to 11 mils. In an embodiment, wherein the multi-layer media has a thickness of 3 to 15 mils. In an embodiment, wherein the multi-layer media has a thickness of less than 20 mils. In an embodiment, wherein the multi-layer media has a thickness of less than 20 mils. In an embodiment, wherein the multi-layer media has a thickness of less than 15 mils.

In an embodiment, wherein the multi-layer media has a thickness of less than 12 mils. In an embodiment, wherein the multi-layer media has a thickness of less than 9 mils. In an embodiment, wherein the multi-layer media has a thickness of less than 7 mils. In an embodiment, wherein the multi-layer media has a thickness of less than 6 mils. In an embodiment, wherein the multi-layer media has a thickness of less than 5 mils. In an embodiment, wherein the multi-layer media has a bubble point of 6 to 10 psi. In an embodiment, wherein the multi-layer media has a bubble point of 5 to 11 psi. In an embodiment, wherein the multi-layer media has a bubble point of 4 to 12 psi.

In an embodiment, the PTFE includes expanded PTFE (ePTFE).

In an embodiment, the PTFE has an average pore size of 1.0 to 5.0 microns.

In an embodiment, wherein the polymeric scrim includes spunbond fibers. In an embodiment, wherein the spunbond fibers include polyester fibers.

In an embodiment, wherein the fibers are substantially uniformly distributed.

In an embodiment, wherein the polymeric scrim layer has a basis weight of 0.5 to 1.0 ounces per square yard. In an embodiment, the polymeric scrim layer has a basis weight of 0.6 to 0.9 ounces per square yard. In an embodiment, the polymeric scrim layer has a basis weight of greater than 0.5 ounces per square yard. In an embodiment, the polymeric scrim layer has a basis weight of less than 1.5 ounces per square yard.

In an embodiment, the polymeric scrim layer has a basis weight of less than 2.0 ounces per square yard.

In an embodiment, the polymeric scrim layer has a thickness of 6 mils.

In an embodiment, the polymeric scrim layer has a thickness of 4 to 8 mils. In an embodiment, the polymeric scrim layer has a thickness of 3 to 10 mils. In an embodiment, the polymeric scrim layer has a thickness of less than 12 mils. In an embodiment, the polymeric scrim layer has a thickness of less than 14 mils. In an embodiment, the polymeric scrim layer has a thickness of less than 16 mils.

In an embodiment, the polymeric scrim layer has a frazier air permeability of 800 to 900 cfm/ft2 at 0.5 inches of water. In an embodiment, the polymeric scrim layer has a frazier air permeability of 700 to 1,000 $cfm/ft^2$ at 0.5 inches of water. In an embodiment, the polymeric scrim layer has a frazier air permeability of 600 to 1,100 $cfm/ft^2$ at 0.5 inches of water. In an embodiment, the polymeric scrim layer has a frazier air permeability of 550 to 1,050 $cfm/ft^2$ at 0.5 inches of water. In an embodiment, the polymeric scrim layer has a frazier air permeability of 500 to 1.500 $cfm/ft^2$ at 0.5 inches of water. In an embodiment, wherein the polymeric scrim layer has a frazier air permeability of greater than 500 $cfm/ft^2$ at 0.5 inches of water. In an embodiment, wherein the polymeric scrim layer has a frazier air permeability of greater than 700 $cfm/ft^2$ at 0.5 inches of water. In an embodiment, wherein the polymeric scrim layer has a frazier air permeability of greater than 900 $cfm/ft^2$ at 0.5 inches of water.

In an embodiment, the fibers are substantially uniformly distributed such that the standard deviation of fiber spacing is from 0.5 to 1.0. In an embodiment, the fibers are substantially uniformly distributed such that the standard deviation of fiber spacing is from 0.6 to 0.9. In an embodiment, the fibers are substantially uniformly distributed such that the standard deviation of fiber spacing is from 0.7 to 0.8. In an embodiment, the fibers are substantially uniformly distributed such that the standard deviation of fiber spacing is from 0.5 to 1.0. In an embodiment, further can include an additional layer between the PTFE layer and polymeric scrim layer. In an embodiment, the additional layer includes polypropylene or polyethylene.

In an embodiment, wherein the polymeric scrim layer further includes cellulose.

In an embodiment, the PTFE has a thickness of 6 to 10 mils. In an embodiment, the PTFE has a thickness of 4 to 12 mills. In an embodiment, the PTFE has a thickness of 7 to 9 mils. In an embodiment, the PTFE has a thickness of 2 to 14 mils. In an embodiment, the PTFE has a thickness of 6 to 10 mils. In an embodiment, the PTFE has a thickness of greater than 4 mils. In an embodiment, the PTFE has a thickness of greater than 5 mils.

In an embodiment, the PTFE has a thickness of greater than 6 mils. In an embodiment, wherein the PTFE has a thickness of greater than 7 mils. In an embodiment, the PTFE has a thickness of less than 9 mils. In an embodiment, the PTFE has a thickness of less than 10 mils.

In an embodiment, the PTFE has a thickness of less than 12 mils. In an embodiment, the PTFE has a thickness of less than 15 mils. In an embodiment, the PTFE has a thickness of less than 20 mils. In an embodiment, the PTFE has an air perm of 200 to 300 cfm/ft2. In an embodiment, the PTFE has an air perm of 150 to 350 cfm/ft2. In an embodiment, the PTFE has an air perm of 100 to 400 cfm/ft2. In an embodiment, the PTFE has an air perm of 500 to 500 cfm/ft2. In an embodiment, the PTFE has an air perm of greater than 100 cfm/ft2. In an embodiment, the PTFE has an air perm of greater than 125 cfm/ft2. In an embodiment, the PTFE has an air perm of greater than 150 cfm/ft2. In an embodiment, the PTFE has an air perm of greater than 200 cfm/ft2. In an embodiment, the PTFE has an air perm of greater than 225 cfm/ft2. In an embodiment, the PTFE has an air perm of less than 275 cfm/ft2. In an embodiment, the PTFE has an air perm of less than 300 cfm/ft2 In an embodiment, the PTFE has an air perm of less than 350 cfm/ft2. In an embodiment, the PTFE has an air perm of less than 400 cfm/ft2. In an embodiment, the PTFE has an air perm of less than 500 cfm/ft2. In an embodiment, the PTFE has an air perm of less than 1000 cfm/ft2. In an embodiment, the PTFE has a mullen burst of 25 to 75 psi. In an embodiment, the PTFE has a mullen burst of 10 to 90 psi. In an embodiment, the PTFE has a mullen burst of 10 to 100 psi. In an embodiment, the PTFE has a mullen burst of less than 125 psi. In an embodiment, the PTFE has a mullen burst of less than 150 psi. In an embodiment, the PTFE has a mullen burst of less than 200 psi. In an embodiment, the PTFE has a strip tensile strength (MD/CD, kg/5 cm) of 60/48.

In an embodiment, the PTFE has a strip tensile strength (MD/CD, kg/5 cm) of 40 to 80/40 to 60. In an embodiment, the PTFE has a strip tensile strength (MD/CD, kg/5 cm) of 30 to 90/30 to 70. In an embodiment, the PTFE has a strip tensile strength (MD/CD, kg/5 cm) of 20 to 100/20 to 80.

In an embodiment, the PTFE has a basis weight of 1.0 to 3.0 ounces per square yard. In an embodiment, the PTFE has a basis weight of 1.5 to 2.5 ounces per square yard. In an embodiment, the PTFE has a basis weight of 0.5 to 3.0 ounces per square yard. In an embodiment, the PTFE has a basis weight of greater than 0.5 ounces per square yard. In an embodiment, the PTFE has a basis weight of greater than 1.0 ounces per square yard. In an embodiment, the PTFE has a basis weight of greater than 1.5 ounces per square yard. In an embodiment, the PTFE has a basis weight of less than 3.0 ounces per square yard. In an embodiment, the PTFE has a basis weight of less than 4.0 ounces per square yard. In an embodiment, the PTFE has a basis weight of less than 5.0 ounces per square yard.

Further aspects of the present subject matter include the following:

1. In a first embodiment, a filtration media pack comprising:
   (a) a plurality of layers of single facer media wherein the layers of single facer media comprise a fluted sheet, a facing sheet, and a plurality of flutes extending between the fluted sheet and the facing sheet and having a flute length extending from a first face of the filtration media pack to a second face of the filtration media pack;
   (b) a first portion of the plurality of flutes being closed to unfiltered fluid flowing into the first portion of the plurality of flutes, and a second portion of the plurality of flutes being closed to unfiltered fluid flowing out of the second portion of the plurality of flutes so that fluid passing into one of the first face or the second face of the media pack and out the other of the first face or the second face of the media pack passes through media to provide filtration of the fluid; wherein
   the fluted sheet and facing sheet formed of multi-layer media comprising a polytetrafluoroethylene (PTFE) layer supported by a polymeric scrim layer.

2. The filtration media pack of any of embodiments 1 and 3-154, wherein the polymeric scrim layer has an external maximum peak height $S_P$, measured between the highest peak and the mean plane, of less than 5μ-100μ.

3. The filtration media pack of any of embodiments 1-2 and 4-154, wherein the polymeric scrim layer has an external maximum peak height $S_P$, measured between the highest peak and the mean plane, of greater than 5μ.

4. The filtration media pack of any of embodiments 1-3 and 5-154, wherein the polymeric scrim layer has an external maximum peak height $S_P$, measured between the highest peak and the mean plane, of less than 100μ.

5. The filtration media pack of any of embodiments 1-4 and 6-154, wherein the polymeric scrim layer has an external maximum peak height $S_P$, measured between the highest peak and the mean plane, of less than 80μ.

6. The filtration media pack of any of embodiments 1-5 and 7-154, wherein the polymeric scrim layer has an external maximum peak height $S_P$, measured between the highest peak and the mean plane, of less than 60μ.

7. The filtration media pack of any of embodiments 1-6 and 8-154, wherein the polymeric scrim layer has an external maximum peak height $S_P$, measured between the highest peak and the mean plane, of less than 50μ.

8. The filtration media pack of any of embodiments 1-7 and 9-154, wherein the polymeric scrim layer has an external maximum peak height $S_P$, measured between the highest peak and the mean plane, of less than 40μ.

9. The filtration media pack of any of embodiments 1-8 and 10-154, wherein the polymeric scrim layer has an external maximum peak height $S_P$, measured between the highest peak and the mean plane, of less than 30μ.

10. The filtration media pack of any of embodiments 1-9 and 11-154, wherein the polymeric scrim layer has an external maximum peak height $S_P$, measured between the highest peak and the mean plane, of less than 20μ.

11. The filtration media pack of any of embodiments 1-10 and 12-154, wherein the polymeric scrim layer has an external root mean square height $S_q$, of less than 100μ according to the formula:

$$Sq = \sqrt{\frac{1}{A}\int\int_A z^2(x, y)dxdy}.$$

12. The filtration media pack of any of embodiments 1-11 and 13-154, wherein the polymeric scrim layer has an external root mean square height $S_q$, of less than 75μ according to the formula:

$$Sq = \sqrt{\frac{1}{A}\int\int_A z^2(x, y)dxdy}.$$

13. The filtration media pack of any of embodiments 1-12 and 14-154, wherein the polymeric scrim layer has an external root mean square height $S_q$, of less than 50μ according to the formula:

$$Sq = \sqrt{\frac{1}{A}\int\int_A z^2(x, y)dxdy}.$$

14. The filtration media pack of any of embodiments 1-13 and 15-154, wherein the polymeric scrim layer has an external root mean square height $S_q$, of less than 40μ according to the formula:

$$Sq = \sqrt{\frac{1}{A}\int\int_A z^2(x, y)dxdy}.$$

15. The filtration media pack of any of embodiments 1-14 and 16-154, wherein the polymeric scrim layer has an external root mean square height $S_q$, of less than 35μ according to the formula:

$$Sq = \sqrt{\frac{1}{A}\int\int_A z^2(x, y)dxdy}.$$

16. The filtration media pack of any of embodiments 1-15 and 17-154, wherein the polymeric scrim layer has an external root mean square height $S_q$, of less than 20μ according to the formula:

$$Sq = \sqrt{\frac{1}{A}\int\int_A z^2(x, y)dxdy}.$$

17. The filtration media pack of any of embodiments 1-16 and 18-154, wherein the polymeric scrim layer has an external arithmetical mean height $S_a$ of less than 100μ, according to the following formula:

$$Sa = \frac{1}{A}\int\int_A |z(x, y)|dxdy.$$

18. The filtration media pack of any of embodiments 1-17 and 19-154, wherein the polymeric scrim layer has an external arithmetical mean height $S_a$ of less than 75μ according to the following formula:

$$Sa = \frac{1}{A}\int\int_A |z(x, y)|dxdy.$$

19. The filtration media pack of any of embodiments 1-18 and 20-154, wherein the polymeric scrim layer has an external arithmetical mean height $S_a$ of less than 60μ according to the following formula:

$$Sa = \frac{1}{A}\int\int_A |z(x, y)|dxdy.$$

20. The filtration media pack of any of embodiments 1-19 and 21-154, wherein the polymeric scrim layer has an external arithmetical mean height $S_a$ of less than 50μ according to the following formula:

$$Sa = \frac{1}{A}\int\int_A |z(x, y)|dxdy.$$

21. The filtration media pack of any of embodiments 1-20 and 22-154, wherein the polymeric scrim layer has an external arithmetical mean height $S_a$ of less than 40μ.

$$Sa = \frac{1}{A}\int\int_A |z(x, y)|dxdy.$$

22. The filtration media pack of any of embodiments 1-21 and 23-154, wherein the polymeric scrim layer has an external arithmetical mean height $S_a$ of less than 30μ.

$$Sa = \frac{1}{A}\int\int_A |z(x, y)|dxdy.$$

23. The filtration media pack of any of embodiments 1-22 and 24-154, wherein the polymeric scrim layer has an external arithmetical mean height $S_a$ of less than 20μ.

$$Sa = \frac{1}{A}\int\int_A |z(x, y)|dxdy.$$

24. The filtration media pack of any of embodiments 1-23 and 25-154, wherein the polymeric scrim layer has fibers having a mean diameter of 10 to 20μ and a standard deviation of less than 5μ.

25. The filtration media pack of any of embodiments 1-24 and 26-154, wherein the polymeric scrim layer has fibers having a mean diameter of 5 to 30 μ and a standard deviation of less than 5μ.

26. The filtration media pack of any of embodiments 1-25 and 27-154, wherein the polymeric scrim layer has fibers having a mean diameter of 10 to 20 and a standard deviation of less than 3μ.

27. The filtration media pack of any of embodiments 1-26 and 28-154, wherein the polymeric scrim layer has fibers having a mean diameter of 12 to 18 and a standard deviation of less than 2μ.

28. The filtration media pack of any of embodiments 1-27 and 29-154, wherein the polymeric scrim layer has fibers having a standard deviation of less than 2μ.

29. The filtration media pack of any of embodiments 1-28 and 30-154, wherein the polymeric scrim layer has fibers having a uniformity of distribution of measured as variance from the mean density of −1.0 to −0.25 as measured by the following formula:

$$\text{Index of Dispersion, } I_d = \frac{\sigma^2}{\mu}.$$

30. The filtration media pack of any of embodiments 1-29 and 31-154, wherein the polymeric scrim layer has fibers having a uniformity of distribution of −1 to −0.5 as measured by the following formula:

$$\text{Index of Dispersion, } I_d = \frac{\sigma^2}{\mu}.$$

31. The filtration media pack of any of embodiments 1-30 and 32-154, wherein the polymeric scrim layer has fibers having a uniformity of distribution of greater than −1.5 as measured by the following formula:

$$\text{Index of Dispersion, } I_d = \frac{\sigma^2}{\mu}.$$

32. The filtration media pack of any of embodiments 1-31 and 33-154, wherein the polymeric scrim layer has fibers having a uniformity of distribution of greater than −2.0 as measured by the following formula:

$$\text{Index of Dispersion, } I_d = \frac{\sigma^2}{\mu}.$$

33. The filtration media pack of any of embodiments 1-32 and 34-154, wherein the polymeric scrim layer has fibers having a uniformity of distribution of greater than −3.0 as measured by the following formula:

$$\text{Index of Dispersion, } I_d = \frac{\sigma^2}{\mu}.$$

34. The filtration media pack of any of embodiments 1-33 and 35-154, wherein the polymeric scrim layer has fibers having a uniformity of contact points of less than 3.0.

35. The filtration media pack of any of embodiments 1-34 and 36-154, wherein the polymeric scrim layer has fibers having a uniformity of contact points of less than 2.0.

36. The filtration media pack of any of embodiments 1-35 and 37-154, wherein the polymeric scrim layer has fibers having a uniformity of contact points of less than 1.5.

37. The filtration media pack of any of embodiments 1-36 and 38-154, wherein the polymeric scrim layer has fibers having a uniformity of contact points of less than 1.0.

38. The filtration media pack of any of embodiments 1-37 and 39-154, wherein the polymeric scrim layer has fibers having a uniformity of contact points 0.5 to 2.5.

39. The filtration media pack of any of embodiments 1-38 and 40-154, wherein the polymeric scrim layer has fibers having a uniformity of contact points 1.0 to 2.0.

40. The filtration media pack of any of embodiments 1-39 and 41-154, wherein the multi-layer media has air permeability of 2.0 to 3.0 cubic feet per minute (CFM).

41. The filtration media pack of any of embodiments 1-40 and 42-154, wherein the multi-layer media has air permeability of 1.5 to 4.0 cubic feet per minute (CFM).

42. The filtration media pack of any of embodiments 1-41 and 43-154, wherein the multi-layer media has air permeability of 1.0 to 5.0 cubic feet per minute (CFM).

43. The filtration media pack of any of embodiments 1-42 and 44-154, wherein the multi-layer media has air permeability of 0.5 to 6.0 cubic feet per minute (CFM).

44. The filtration media pack of any of embodiments 1-43 and 45-154, wherein the multi-layer media has air permeability of greater than 2.0 cubic feet per minute (CFM).

45. The filtration media pack of any of embodiments 1-44 and 46-154, wherein the multi-layer media has air permeability of greater than 2.5 cubic feet per minute (CFM).

46. The filtration media pack of any of embodiments 1-45 and 47-154, wherein the multi-layer media has air permeability of greater than 3.0 cubic feet per minute (CFM).

47. The filtration media pack of any of embodiments 1-46 and 48-154, wherein the multi-layer media has air permeability of greater than 4.0 cubic feet per minute (CFM).

48. The filtration media pack of any of embodiments 1-47 and 49-154, wherein the multi-layer media has air permeability of greater than 5.0 cubic feet per minute (CFM).

49. The filtration media pack of any of embodiments 1-48 and 50-154, wherein the filter pack has efficiency of 99.97 percent of 3 micron particles at a flow rate of 1200 cfm through the media pack.

50. The filtration media pack of any of embodiments 1-49 and 51-154, wherein the filter pack has efficiency of 99.97 percent of 3 micron particles at a flow rate of 800 cfm through the media pack.

51. The filtration media pack of any of embodiments 1-50 and 52-154, wherein the filter pack has efficiency of 99.97 percent of 3 micron particles at a flow rate of 1600 cfm through the media pack.

52. The filtration media pack of any of embodiments 1-51 and 53-154, wherein the filter pack has efficiency of 99.97 percent of 3 micron particles at a flow rate of 2400 cfm through the media pack.

53. The filtration media pack of any of embodiments 1-52 and 54-154, wherein the filter pack has efficiency of 99.97 percent of 3 micron particles at a flow rate of 3000 cfm through the media pack.

54. The filtration media pack of any of embodiments 1-53 and 55-154, wherein the filter pack has an efficiency of 99.97 percent of 3 micron particles at a face velocity of 5 to 25 feet per minute.

55. The filtration media pack of any of embodiments 1-54 and 56-154, wherein the filter pack has an efficiency of 99.97 percent of 3 micron particles at a face velocity of 5 feet per minute.

56. The filtration media pack of any of embodiments 1-55 and 57-154, wherein the filter pack has an efficiency of 99.97 percent of 3 micron particles at a face velocity of 10 feet per minute.

57. The filtration media pack of any of embodiments 1-56 and 58-154, wherein the filter pack has efficiency of 99.97 percent of 3 micron particles at a face velocity of 15 feet per minute.

58. The filtration media pack of any of embodiments 1-57 and 59-154, wherein the filter pack has efficiency of 99.97 percent of 3 micron particles at a face velocity of 20 feet per minute.

59. The filtration media pack of any of embodiments 1-58 and 60-154, wherein the filter pack has efficiency of 99.97 percent of 3 micron particles at a face velocity of 25 feet per minute.

60. The filtration media pack of any of embodiments 1-59 and 61-154, wherein the filter pack has efficiency of 99.97 percent of 3 micron particles at a face velocity of 30 feet per minute.

61. The filtration media pack of any of embodiments 1-60 and 62-154, wherein the multi-layer media has a thickness of 6 to 9 mils.

62. The filtration media pack of any of embodiments 1-61 and 63-154, wherein the multi-layer media has a thickness of 5 to 10 mils.

63. The filtration media pack of any of embodiments 1-62 and 64-154, wherein the multi-layer media has a thickness of 4 to 11 mils.

64. The filtration media pack of any of embodiments 1-63 and 65-154, wherein the multi-layer media has a thickness of 3 to 15 mils.

65. The filtration media pack of any of embodiments 1-64 and 66-154, wherein the multi-layer media has a thickness of less than 22 mils.

66. The filtration media pack of any of embodiments 1-65 and 67-154, wherein the multi-layer media has a thickness of less than 20 mils.

67. The filtration media pack of any of embodiments 1-66 and 68-154, wherein the multi-layer media has a thickness of less than 15 mils.

68. The filtration media pack of any of embodiments 1-67 and 69-154, wherein the multi-layer media has a thickness of less than 12 mils.

69. The filtration media pack of any of embodiments 1-68 and 70-154, wherein the multi-layer media has a thickness of less than 9 mils.

70. The filtration media pack of any of embodiments 1-69 and 71-154, wherein the multi-layer media has a thickness of less than 7 mils.

71. The filtration media pack of any of embodiments 1-70 and 72-154, wherein the multi-layer media has a thickness of less than 6 mils.

72. The filtration media pack of any of embodiments 1-71 and 73-154, wherein the multi-layer media has a thickness of less than 5 mils.

73. The filtration media pack of any of embodiments 1-72 and 74-154, wherein the multi-layer media has a bubble point of 6 to 10 psi.

74. The filtration media pack of any of embodiments 1-73 and 75-154, wherein the multi-layer media has a bubble point of 5 to 11 psi.

75. The filtration media pack of any of embodiments 1-74 and 76-154, wherein the multi-layer media has a bubble point of 4 to 12 psi.

76. The filtration media pack of any of embodiments 1-75 and 77-154, wherein the PTFE comprises expanded PTFE (ePTFE).

77. The filtration media pack of any of embodiments 1-76 and 78-154, wherein the PTFE has an average pore size of 1.0 to 5.0 microns.

78. The filtration media pack of any of embodiments 1-77 and 79-154, wherein the polymeric scrim comprises spunbond fibers.

79. The filtration media pack of any of embodiments 1-78 and 80-154, wherein the spunbond fibers comprise polyester fibers.

80. The filtration media pack of any of embodiments 1-79 and 81-154, wherein the fibers are substantially uniformly distributed.

81. The filtration media pack of any of embodiments 1-80 and 82-154, wherein the polymeric scrim layer has a basis weight of 0.5 to 1.0 ounces per square yard.

82. The filtration media pack of any of embodiments 1-81 and 83-154, wherein the polymeric scrim layer has a basis weight of 0.6 to 0.9 ounces per square yard.

83. The filtration media pack of any of embodiments 1-82 and 84-154, wherein the polymeric scrim layer has a basis weight of greater than 0.5 ounces per square yard.

84. The filtration media pack of any of embodiments 1-83 and 85-154, wherein the polymeric scrim layer has a basis weight of less than 1.5 ounces per square yard.

85. The filtration media pack of any of embodiments 1-84 and 86-154, wherein the polymeric scrim layer has a basis weight of less than 2.0 ounces per square yard.

86. The filtration media pack of any of embodiments 1-85 and 87-154, wherein the polymeric scrim layer has a thickness of 6 mils.

87. The filtration media pack of any of embodiments 1-86 and 88-154, wherein the polymeric scrim layer has a thickness of 4 to 8 mils.

88. The filtration media pack of any of embodiments 1-87 and 89-154, wherein the polymeric scrim layer has a thickness of 3 to 10 mils.

89. The filtration media pack of any of embodiments 1-88 and 90-154, wherein the polymeric scrim layer has a thickness of less than 12 mils.

90. The filtration media pack of any of embodiments 1-89 and 91-154, wherein the polymeric scrim layer has a thickness of less than 14 mils.

91. The filtration media pack of any of embodiments 1-90 and 92-154, wherein the polymeric scrim layer has a thickness of less than 16 mils.

92. The filtration media pack of any of embodiments 1-91 and 93-154, wherein the polymeric scrim layer has a frazier air permeability of 800 to 900 cfm/ft$^2$ at 0.5 inches of water.

93. The filtration media pack of any of embodiments 1-92 and 94-154, wherein the polymeric scrim layer has a frazier air permeability of 700 to 1,000 cfm/ft$^2$ at 0.5 inches of water.

94. The filtration media pack of any of embodiments 1-93 and 95-154, wherein the polymeric scrim layer has a frazier air permeability of 600 to 1,100 cfm/ft$^2$ at 0.5 inches of water.

95. The filtration media pack of any of embodiments 1-94 and 96-154, wherein the polymeric scrim layer has a frazier air permeability of 550 to 1,050 cfm/ft$^2$ at 0.5 inches of water.

96. The filtration media pack of any of embodiments 1-95 and 97-154, wherein the polymeric scrim layer has a frazier air permeability of 500 to 1.500 cfm/ft$^2$ at 0.5 inches of water.

97. The filtration media pack of any of embodiments 1-96 and 98-154, wherein the polymeric scrim layer has a frazier air permeability of greater than 500 cfm/ft$^2$ at 0.5 inches of water.

98. The filtration media pack of any of embodiments 1-97 and 99-154, wherein the polymeric scrim layer has a frazier air permeability of greater than 700 cfm/ft$^2$ at 0.5 inches of water.

99. The filtration media pack of any of embodiments 1-98 and 100-154, wherein the polymeric scrim layer has a frazier air permeability of greater than 900 cfm/ft2 at 0.5 inches of water.

100. The filtration media pack of any of embodiments 1-99 and 101-154, wherein the fibers are substantially uniformly distributed such that the standard deviation of fiber spacing is from 0.5 to 1.0.

101. The filtration media pack of any of embodiments 1-100 and 102-154, wherein the fibers are substantially uniformly distributed such that the standard deviation of fiber spacing is from 0.6 to 0.9.

102. The filtration media pack of any of embodiments 1-101 and 103-154, wherein the fibers are substantially uniformly distributed such that the standard deviation of fiber spacing is from 0.7 to 0.8.

103. The filtration media pack of any of embodiments 1-102 and 104-154, wherein the fibers are substantially uniformly distributed such that the standard deviation of fiber spacing is from 0.25 to 1.0.

104. The filtration media pack of any of embodiments 1-103 and 105-154, further comprising an additional layer between the PTFE layer and polymeric scrim layer.

105. The filtration media pack of any of embodiments 1-104 and 106-154, wherein the additional layer comprises polypropylene or polyethylene.

106. The filtration media pack of any of embodiments 1-105 and 107-154, wherein the polymeric scrim layer further comprises cellulose.

107. The filtration media pack of any of embodiments 1-106 and 108-154, wherein the PTFE has a thickness of 6 to 10 mils.

108. The filtration media pack of any of embodiments 1-107 and 109-154, wherein the PTFE has a thickness of 4 to 12 mils.

109. The filtration media pack of any of embodiments 1-108 and 110-154, wherein the PTFE has a thickness of 7 to 9 mils.

110. The filtration media pack of any of embodiments 1-109 and 111-154, wherein the PTFE has a thickness of 2 to 14 mils.

111. The filtration media pack of any of embodiments 1-110 and 112-154, wherein the PTFE has a thickness of 5 to 10 mils.

112. The filtration media pack of any of embodiments 1-111 and 113-154, wherein the PTFE has a thickness of greater than 4 mils.

113. The filtration media pack of any of embodiments 1-112 and 114-154, wherein the PTFE has a thickness of greater than 5 mils.

114. The filtration media pack of any of embodiments 1-113 and 115-154, wherein the PTFE has a thickness of greater than 6 mils.

115. The filtration media pack of any of embodiments 1-114 and 116-154, wherein the PTFE has a thickness of greater than 7 mils.

116. The filtration media pack of any of embodiments 1-115 and 117-154, wherein the PTFE has a thickness of less than 9 mils.

117. The filtration media pack of any of embodiments 1-116 and 118-154, wherein the PTFE has a thickness of less than 10 mils.

118. The filtration media pack of any of embodiments 1-117 and 119-154, wherein the PTFE has a thickness of less than 12 mils.

119. The filtration media pack of any of embodiments 1-118 and 120-154, wherein the PTFE has a thickness of less than 15 mils.

120. The filtration media pack of any of embodiments 1-119 and 121-154, wherein the PTFE has a thickness of less than 20 mils.

121. The filtration media pack of any of embodiments 1-120 and 122-154, wherein the PTFE has an air perm of 200 to 300 cfm/ft$^2$.

122. The filtration media pack of any of embodiments 1-121 and 123-154, wherein the PTFE has an air perm of 150 to 350 cfm/ft$^2$.

123. The filtration media pack of any of embodiments 1-122 and 124-154, wherein the PTFE has an air perm of 100 to 400 cfm/ft$^2$.

124. The filtration media pack of any of embodiments 1-123 and 125-154, wherein the PTFE has an air perm of 500 to 500 cfm/ft$^2$.

125. The filtration media pack of any of embodiments 1-124 and 126-154, wherein the PTFE has an air perm of greater than 100 cfm/ft$^2$.

126. The filtration media pack of any of embodiments 1-125 and 127-154, wherein the PTFE has an air perm of greater than 125 cfm/ft$^2$.

127. The filtration media pack of any of embodiments 1-126 and 128-154, wherein the PTFE has an air perm of greater than 150 cfm/ft$^2$.

128. The filtration media pack of any of embodiments 1-127 and 129-154, wherein the PTFE has an air perm of greater than 200 cfm/ft$^2$.

129. The filtration media pack of any of embodiments 1-128 and 130-154, wherein the PTFE has an air perm of greater than 225 cfm/ft$^2$.

130. The filtration media pack of any of embodiments 1-129 and 131-154, wherein the PTFE has an air perm of less than 275 cfm/ft$^2$.

131. The filtration media pack of any of embodiments 1-130 and 132-154, wherein the PTFE has an air perm of less than 300 cfm/ft$^2$.

132. The filtration media pack of any of embodiments 1-131 and 133-154, wherein the PTFE has an air perm of less than 350 cfm/ft$^2$.

133. The filtration media pack of any of embodiments 1-132 and 134-154, wherein the PTFE has an air perm of less than 400 cfm/ft$^2$.

134. The filtration media pack of any of embodiments 1-133 and 135-154, wherein the PTFE has an air perm of less than 500 cfm/ft$^2$.

135. The filtration media pack of any of embodiments 1-134 and 136-154, wherein the PTFE has an air perm of less than 1000 cfm/ft$^2$.

136. The filtration media pack of any of embodiments 1-135 and 137-154, wherein the PTFE has a mullen burst of 25 to 75 psi.

137. The filtration media pack of any of embodiments 1-136 and 138-154, wherein the PTFE has a mullen burst of 10 to 90 psi.

138. The filtration media pack of any of embodiments 1-137 and 139-154, wherein the PTFE has a mullen burst of 10 to 100 psi.

139. The filtration media pack of any of embodiments 1-138 and 140-154, wherein the PTFE has a mullen burst of less than 125 psi.

140. The filtration media pack of any of embodiments 1-139 and 141-154, wherein the PTFE has a mullen burst of less than 150 psi.

141. The filtration media pack of any of embodiments 1-140 and 142-154, wherein the PTFE has a mullen burst of less than 200 psi.

142. The filtration media pack of any of embodiments 1-141 and 143-154, wherein the PTFE has a strip tensile strength (MD/CD, kg/5 cm) of 60/48.

143. The filtration media pack of any of embodiments 1-142 and 144-154, wherein the PTFE has a strip tensile strength (MD/CD, kg/5 cm) of 40 to 80/40 to 60.

144. The filtration media pack of any of embodiments 1-143 and 145-154, wherein the PTFE has a strip tensile strength (MD/CD, kg/5 cm) of 30 to 90/30 to 70.

145. The filtration media pack of any of embodiments 1-144 and 146-154, wherein the PTFE has a strip tensile strength (MD/CD, kg/5 cm) of 20 to 100/20 to 80.

146. The filtration media pack of any of embodiments 1-145 and 147-154, wherein the PTFE has a basis weight of 1.0 to 3.0 ounces per square yard.

147. The filtration media pack of any of embodiments 1-146 and 148-154, wherein the PTFE has a basis weight of 1.5 to 2.5 ounces per square yard.

148. The filtration media pack of any of embodiments 1-147 and 149-154, wherein the PTFE has a basis weight of 0.5 to 3.0 ounces per square yard.

149. The filtration media pack of any of embodiments 1-148 and 150-154, wherein the PTFE has a basis weight of greater than 0.5 ounces per square yard.

150. The filtration media pack of any of embodiments 1-149 and 151-154, wherein the PTFE has a basis weight of greater than 1.0 ounces per square yard.

151. The filtration media pack of any of embodiments 1-150 and 152-154, wherein the PTFE has a basis weight of greater than 1.5 ounces per square yard.

152. The filtration media pack of any of embodiments 1-151 and 153-154, wherein the PTFE has a basis weight of less than 3.0 ounces per square yard.

153. The filtration media pack of any of embodiments 1-152 and 154, wherein the PTFE has a basis weight of less than 4.0 ounces per square yard.

154. The filtration media pack of any of embodiments 1-153, wherein the PTFE has a basis weight of less than 5.0 ounces per square yard.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A filtration media pack comprising:
  (a) a plurality of layers of single facer media wherein the layers of single facer media comprise a fluted sheet, a facing sheet, and a plurality of flutes extending between the fluted sheet and the facing sheet and having a flute length extending from a first face of the filtration media pack to a second face of the filtration media pack;
  (b) a first portion of the plurality of flutes being closed to unfiltered fluid flowing into the first portion of the plurality of flutes, and a second portion of the plurality of flutes being closed to unfiltered fluid flowing out of the second portion of the plurality of flutes so that fluid passing into one of the first face or the second face of the media pack and out the other of the first face or the second face of the media pack passes through media to provide filtration of the fluid; wherein
  the fluted sheet and facing sheet formed of multi-layer media comprising a polytetrafluoroethylene (PTFE) layer supported by a polymeric scrim layer; and
  wherein the polymeric scrim layer has an external maximum peak height $S_P$, measured between a highest peak and a mean plane, of less than 5μ.

2. The filtration media pack of claim 1, wherein the polymeric scrim layer has an external root mean square height $S_q$, of less than 40μ according to the formula:

$$Sq = \sqrt{\frac{1}{A}\int\int_A z^2(x, y)dxdy}$$

wherein A is area of the polymeric scrim layer measured, x and y are coordinates within a plane formed by the polymeric scrim layer, and z is elevation perpendicular to the plane formed by the polymeric scrim layer.

3. The filtration media pack of claim 1, wherein the polymeric scrim layer has an external root mean square height $S_q$, of less than 20μ according to the formula:

$$Sq = \sqrt{\frac{1}{A}\int\int_A z^2(x, y)dxdy}$$

wherein A is area of the polymeric scrim layer measured, x and y are coordinates within a plane formed by the polymeric scrim layer, and z is elevation perpendicular to the plane formed by the polymeric scrim layer.

4. The filtration media pack of claim 1, wherein the polymeric scrim layer has an external arithmetical mean height $S_a$ of less than 60μ according to the following formula:

$$Sa = \frac{1}{A}\int\int_A |z(x, y)|dxdy$$

wherein A is area of the polymeric scrim layer measured, x and y are coordinates within a plane formed by the polymeric scrim layer, and z is elevation perpendicular to the plane formed by the polymeric scrim layer.

5. The filtration media pack of claim 1, wherein the polymeric scrim layer has an external arithmetical mean height $S_a$ of less than 30μ

$$Sa = \frac{1}{A} \int \int_A |z(x, y)| dx dy$$

wherein A is area of the polymeric scrim layer measured, x and y are coordinates within a plane formed by the polymeric scrim layer, and z is elevation perpendicular to the plane formed by the polymeric scrim layer.

6. The filtration media pack of claim 1, wherein the polymeric scrim layer has an external arithmetical mean height $S_a$ of less than 20μ

$$Sa = \frac{1}{A} \int \int_A |z(x, y)| dx dy$$

wherein A is area of the polymeric scrim layer measured, x and y are coordinates within a plane formed by the polymeric scrim layer, and z is elevation perpendicular to the plane formed by the polymeric scrim layer.

7. The filtration media pack of claim 1, wherein the polymeric scrim layer has fibers having a mean diameter of 10 to 20 μ and a standard deviation of less than 3 μ.

8. The filtration media pack of claim 1, wherein the polymeric scrim layer has fibers having a mean diameter of 12 to 18 μ and a standard deviation of less than 2 μ.

9. The filtration media pack of claim 1, wherein the polymeric scrim layer has fibers having a index of distribution of −1 to −0.5 as measured by the following formula:

$$\text{Index of Dispersion, } I_d = \frac{\sigma^2}{\mu}$$

wherein $\sigma^2$ is variance of dispersion and u is mean dispersion.

10. The filtration media pack of claim 1, wherein the multi-layer media has air permeability of greater than 4.0 cubic feet per minute (CFM).

11. The filtration media pack of claim 1, wherein the filter pack has an efficiency of 99.97 percent of 3 micron particles at a face velocity of 10 feet per minute.

12. The filtration media pack of claim 1, wherein the multi-layer media has a thickness of less than 20 mils.

13. The filtration media pack of claim 1, wherein the polymeric scrim comprises spunbond fibers.

14. The filtration media pack of claim 13, wherein the spunbond fibers comprise polyester fibers.

15. The filtration media pack of claim 1, wherein the polymeric scrim layer has a basis weight of less than 2.0 ounces per square yard.

16. The filtration media pack of claim 1, wherein the polymeric scrim layer has a frazier air permeability of greater than 900 cfm/ft² at 0.5 inches of water.

17. The filtration media pack of claim 1, wherein the PTFE has a basis weight of 1.5 to 2.5 ounces per square yard.

18. The filtration media pack of claim 1, wherein the PTFE has a basis weight of less than 3.0 ounces per square yard.

19. A filtration media pack comprising:
(a) a plurality of layers of single facer media wherein the layers of single facer media comprise a fluted sheet, a facing sheet, and a plurality of flutes extending between the fluted sheet and the facing sheet and having a flute length extending from a first face of the filtration media pack to a second face of the filtration media pack;
(b) a first portion of the plurality of flutes being closed to unfiltered fluid flowing into the first portion of the plurality of flutes, and a second portion of the plurality of flutes being closed to unfiltered fluid flowing out of the second portion of the plurality of flutes so that fluid passing into one of the first face or the second face of the media pack and out the other of the first face or the second face of the media pack passes through media to provide filtration of the fluid; wherein
the fluted sheet and facing sheet formed of multi-layer media comprising a polytetrafluoroethylene (PTFE) layer supported by a polymeric scrim layer; and
wherein the polymeric scrim layer has an external root mean square height $S_q$, of less than 40μ according to the formula:

$$Sq = \sqrt{\frac{1}{A} \int \int_A z^2(x, y) dx dy}$$

wherein A is area of the polymeric scrim layer measured, x and y are coordinates within a plane formed by the polymeric scrim layer, and z is elevation perpendicular to the plane formed by the polymeric scrim layer.

20. A filtration media pack comprising:
(a) a plurality of layers of single facer media wherein the layers of single facer media comprise a fluted sheet, a facing sheet, and a plurality of flutes extending between the fluted sheet and the facing sheet and having a flute length extending from a first face of the filtration media pack to a second face of the filtration media pack;
(b) a first portion of the plurality of flutes being closed to unfiltered fluid flowing into the first portion of the plurality of flutes, and a second portion of the plurality of flutes being closed to unfiltered fluid flowing out of the second portion of the plurality of flutes so that fluid passing into one of the first face or the second face of the media pack and out the other of the first face or the second face of the media pack passes through media to provide filtration of the fluid; wherein
the fluted sheet and facing sheet formed of multi-layer media comprising a polytetrafluoroethylene (PTFE) layer supported by a polymeric scrim layer
wherein the polymeric scrim layer has fibers having a index of distribution of −1 to −0.5 as measured by the following formula:

$$\text{Index of Dispersion, } I_d = \frac{\sigma^2}{\mu}$$

wherein $\sigma^2$ is variance of dispersion and u is mean dispersion.

* * * * *